(12) United States Patent
Kawaguchi

(10) Patent No.: US 7,623,956 B2
(45) Date of Patent: Nov. 24, 2009

(54) METHOD AND A DEVICE FOR STABILIZATION CONTROL OF A VEHICLE TRAFFIC VOLUME

(75) Inventor: Junichiro Kawaguchi, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 801 days.

(21) Appl. No.: 11/365,316

(22) Filed: Feb. 28, 2006

(65) Prior Publication Data

US 2006/0195250 A1    Aug. 31, 2006

(30) Foreign Application Priority Data

Feb. 28, 2005   (JP)   ............... 2005-054000

(51) Int. Cl.
*G08G 1/01* (2006.01)
*G06F 19/00* (2006.01)

(52) U.S. Cl. .............. 701/117; 701/96; 701/118; 340/903

(58) Field of Classification Search ............... 701/117, 701/118, 119, 2, 93, 96, 301, 36; 180/170; 340/903

See application file for complete search history.

(56) References Cited

U.S. PATENT DOCUMENTS

| | | | |
|---|---|---|---|
| 6,249,232 B1 | 6/2001 | Tamura et al. | |
| 6,278,360 B1 | 8/2001 | Yanagi | |
| 6,486,775 B1 | 11/2002 | Lo | |
| 6,765,495 B1 | 7/2004 | Dunning et al. | |
| 2002/0198660 A1 | 12/2002 | Lutter et al. | |
| 2004/0019426 A1* | 1/2004 | Knoop et al. | 701/301 |
| 2004/0078133 A1 | 4/2004 | Miller et al. | |

(Continued)

FOREIGN PATENT DOCUMENTS

DE    199 14 906 A1    10/2000

(Continued)

OTHER PUBLICATIONS

Tsugawa, Sadayuki, et al. "Driving Control of Autonomous Vehicles with Vehicle-to-Vehicle Communication," Society of Instrumentation & Automatic Control, Collected papers, 1990, pp. 1058-1065, vol. 26, No. 9.

(Continued)

*Primary Examiner*—Tan Q Nguyen
(74) *Attorney, Agent, or Firm*—Blakely, Sokoloff, Taylor & Zafman LLP

(57) ABSTRACT

The present invention provides a method and a device, which is in one hand implemented as a man-machine system in which the operations are shared such that a driver takes in charge of an inter-vehicle distance and speed control, while on the other hand a quantity of controls for stabilizing the inter-vehicle distance sequence is calculated automatically and additionally incorporated by the addition in respective vehicles. The stabilization of the inter-vehicle distance can be realized by employing the distributed control method in which a set of acceleration and deceleration information from a vehicle traveling ahead is appropriately integrated and transmitted in relay to a following vehicle. This enables the stabilization of the inter-vehicle distance sequence without requiring the inter-vehicle distance measurement in itself and the easy installation of equipment, and realizes a method in which safety is ensured by allowing the driver to still take charge of a local control.

12 Claims, 12 Drawing Sheets

U.S. PATENT DOCUMENTS

2005/0267658 A1* 12/2005 Yuan et al. .................... 701/36

FOREIGN PATENT DOCUMENTS

| EP | 0 357 963 A2 | 3/1990 |
| EP | 0 625 770 A1 | 11/1994 |
| EP | 1 174 319 A2 | 6/2001 |
| GB | 2 358 506 A | 7/2001 |
| JP | 7017294 | 1/1995 |
| JP | 7017298 | 1/1995 |
| JP | 08-55300 | 2/1996 |
| JP | 11-291791 | 10/1999 |
| JP | 11278098 | 10/1999 |
| JP | 2000006685 | 1/2000 |
| JP | 2000177428 | 6/2000 |
| JP | 2003-231423 | 8/2003 |

OTHER PUBLICATIONS

Tsugawa, Sadayuki, "An Overview on the Intelligent Transport Systems," Japan Robot Society Journal, 1999, pp. 312-320, vol. 17, No. 3.

Uno, Atsuya, et al. "A Merging Control Algorithm of Automated Vehicles Based on Inter-Vehicle Communications," Society of Instrumentation & Automatic Control, Collected papers, 2000, pp. 684-691, vol. 36, No. 8.

Kondou, O Yoshinobu, et al. "Decentralized Control for Group Traveling of Vehicle," the 19th Symposium of Society of Instrumentation & Automatic Control, preliminary copies, 2002, pp. 125-131.

Kumamoto, Hiromitsu, et al. "Longitudinal Vehicle Control by Sliding Mode Theory," Society of Instrumentation & Automatic Control, Collected papers, 1998, pp. 734-740, vol. 34, No. 7.

* cited by examiner

METHOD AND A DEVICE FOR STABILIZATION CONTROL OF A VEHICLE TRAFFIC VOLUME

CROSS-REFERENCE TO RELATED APPLICATIONS

The present patent application claims priority from Japanese Patent Application No. 2005-054000, filed on Feb. 28, 2005.

TITLE OF THE INVENTION

A method and a device for stabilization control of a vehicle traffic volume.

FIELD OF THE INVENTION

The present invention relates to a method and a device directed to provide a vehicle traffic volume control in controlling the traffic of automobiles, railways and the like and a running control for a group of vehicles in their traveling directions, and also to avoid a traffic congestion.

DESCRIPTION OF THE PRIOR ART

A congesting traffic condition in the traffic of vehicles, such as automobiles, railways and the like, is a phenomenon of outcome that may be induced by only a minute change in a distance between two vehicles during cruising, which may be accompanied with no actual obstacles existing on the way but in turn propagated downstream in the traffic, exhibiting extensive amplitude of compression waves of the distance between the following vehicles. As seen in FIG. 1, when a driver in a particular vehicle attempts to control locally a distance between his/her vehicle and a vehicle running ahead thereof, there would occur a delayed information transmission to the vehicle following the particular vehicle, wherein any small disturbance between two vehicles may expand in a vibration form, leading to a congestion in a downstream traffic or instability in the traffic volume. This is exactly a reason why the congestion occurs, even if no particular obstacles are in the way.

[Patent Document 1]
Japanese Patent Laid-open Publication No. 2000-177428
[Patent Document 2]
Japanese Patent Laid-open Publication No. 2000-6685
[Patent Document 3]
Japanese Patent Laid-open Publication No. Hei 11-278098
[Patent Document 4]
Japanese Patent Laid-open Publication No. Hei 7-17298
[Patent Document 5]
Japanese Patent Laid-open Publication No. Hei 7-17294
[Non-Patent Document 1]
Tsugawa, et al., "*Running control for a group of self-controlled vehicles by using an inter-vehicle communication*", Society of Instrumentation & Automatic Control, Collected papers, Vol. 26, No. 9, 1058/1065, 1990.
[Non-Patent Document 2]
Tsugawa, "*General statement of the highway traffic system*", Japan Robot Society Journal; Vol. 17, No. 3, 312/320, 1999.
[Non-Patent Document 3]
Kumamoto, et al., "*Longitudinal control of automobiles by a sliding mode*", Society of Instrumentation & Automatic Control, Collected papers, Vol. 34, No. 7, 734/740, 1998.
[Non-Patent Document 4]
Uno, et al., "*Merging control algorithm for a group of vehicles by using an inter-vehicle communication*", Society of Instrumentation & Automatic Control, Collected papers, Vol. 36, No. 8, 684/691, 2000.

A technology for developing a local control to be applied over a train of vehicles has been already known in the field. To apply the control over the entire train of vehicles, a method for providing an automatic control by measuring a distance between vehicles on behalf of a human being has been considered and suggested in the prior art as shown in FIG. 2. For example, the above-listed Non-patent Document 1 has disclosed a concept of an architecture for transmitting a quantity of operations between vehicles, in which parameters to be transmitted include a distance between vehicles and speed information. The non-Patent Document 2 has introduced, in the Intelligent Transportation System (ITS), a control method in an autonomous controlling manner, in which a distance between vehicles and a relative speed may be measured by using a laser and the like. Additionally, the Patent Documents 1, 3, 4 and 5 have suggested a control unit on the premise of measurement of a distance between vehicles. Since the above-mentioned methods are based on the premises of taking an advantage of a measured value of a distance between vehicles as well as a measured value of a relative speed therebetween, they are believed to be functional for controlling the distance between vehicles and thus serving for resolving the problem of traffic congestion. However, none of those prior art methods has involved the control exclusively by a local acceleration or deceleration quantity for respective vehicles. Further, due to the inter-vehicle communication that is implemented in the bi-directional mode, those methods have a problem that it is difficult to deal with the joining in and departing from the train of vehicles.

Besides, the Patent Documents 2 and 3 have discussed also a manner of communication based on the measurement of the distance between vehicles and the relative speed including additionally a set of acceleration and deceleration information. Further, the non-Patent Document 4 has introduced a control algorithm assuming the presence of the relative speed measurement. However, those suggested methods have exhibited a drawback in association with a certainty level in its measurement of a distance between vehicles, a safety level depending substantially on a mechanical control and/or a manner of installation of the system in the vehicle, consequently with some problems left, which must be solved in order to realize the methods.

[Non-Patent Document 5]
Kondo, et al., "*Running in a group of vehicles by using a distributed control*", the 19th Symposium of Society of Instrumentation & Automatic Control, preliminary copies, pp. 125-131, 2003.

Further, the non-Patent Document 5 has introduced a steering control method. In addition to the above-discussed problems, there are other problems including an inter-lane control problem and a steering problem that could be reviewed, though only the problem of longitudinal travel control may be herein considered.

SUMMARY OF THE INVENTION

Problem to be Solved by the Invention

Although there have been the suggestions as discussed above, a control of vehicle train has not yet been put into practice. The major reasons for that are considered to include: 1) unsolved problems in association with the realization of the practical use of the vehicle train control for carrying out a measurement of a distance between vehicles in a reliable manner regardless of a specific using condition; 2) emergence of a control mechanism principally led by a machine, which hardly permits an intervention of a driver; 3) remaining defect in obtaining compatibility with an operation by a driver; and 4) difficulty in joining in and departing from a vehicle train due to the inter-vehicle communication provided in a bidirectional manner for the purpose of distance and speed measurement. Consequently, there is still a demand for a suggestion of an improved method in which the inter-vehicle communication functionality is provided in a unidirectional manner, as shown in FIG. 3, with no inter-vehicle distance measurement executed so as to facilitate the joining in and departing from the vehicle train and in which the driver is incorporated in the controlling operation effectively and safely.

Means for Solving the Problem

The present invention has been made in the light of the above situations and an object thereof is to provide a method for improving any unstable conditions in a traffic volume, such as a phenomenon of congestion, that could occur even if there is no particular obstacles existing on the way, in an automobile or vehicle traffic on a highway or a railway, in which the method allows for a driver to be incorporated in a controlling operation effectively and safely.

The present invention provides a stabilization control method of a vehicle traffic volume in a group of subject vehicles, said method characterized in comprising:

a receiving step in one vehicle in said group of subject vehicles for receiving a quantity of input requirements for acceleration or deceleration that has been required in another vehicle immediately ahead of said one vehicle to control a distance between vehicles and a speed;

a measuring step in said one vehicle for measuring a quantity of operations for acceleration or deceleration to be applied by a driver of said one vehicle to control the distance between vehicles and the speed;

an addition step for adding said quantity of input requirements for acceleration or deceleration to said quantity of operations for acceleration or deceleration to determine a quantity of requirements for vehicle acceleration or deceleration;

a supply step for supplying said quantity of requirements for vehicle acceleration or deceleration to a driving section of said one vehicle to drive said one vehicle based on said quantity of requirements for vehicle acceleration or deceleration; and a transmission step for transmitting said quantity of requirements for vehicle acceleration or deceleration to another vehicle immediately after said one vehicle so that said other vehicle immediately after said one vehicle can receive said quantity of requirements for vehicle acceleration or deceleration as the quantity of input requirements for acceleration or deceleration, wherein all of said steps subject to said one vehicle are executed in respective vehicles in said group of subject vehicles.

In a preferred aspect, if said quantity of requirements for vehicle acceleration or deceleration obtained in said addition step exceeds an acceleration or deceleration limit value for said one vehicle, said supply step executes a step of supplying said acceleration or deceleration limit value for said one vehicle to the driving section of said one vehicle.

In another aspect, the present invention is characterized in that if said one vehicle comprises an automatic speed control means for maintaining a certain cruising speed by using a set of speed information thereof, said addition step executes a step of summing up said quantity of input requirements for acceleration or deceleration, said quantity of operations for acceleration or deceleration and a quantity of requirements for automatic speed control which is arithmetically produced from said automatic speed control means, to determine said quantity of requirements for vehicle acceleration or deceleration.

In yet another aspect, the present invention is characterized in that said quantity of input requirements for acceleration or deceleration in said addition step represents a value determined by multiplying said quantity of input requirements for acceleration or deceleration received in said receiving step by any arbitrary ratio.

The present invention further provides a device for controlling an acceleration or deceleration of a subject vehicle in a semi-automatic manner by using a set of acceleration or deceleration information in a group of vehicles traveling ahead of said subject vehicle in order to provide a stabilization control of a vehicle traffic volume, said device comprising:

a reception means in said subject vehicle for receiving a quantity of input requirements for acceleration or deceleration that has been required in another vehicle immediately ahead of said subject vehicle to control a distance between vehicles and a speed;

a measuring means in said subject vehicle for measuring a quantity of operations for acceleration or deceleration to be applied by a driver of said subject vehicle to control the distance between vehicles and the speed;

an addition means for adding said quantity of input requirements for acceleration or deceleration to said quantity of operations for acceleration or deceleration to determine a quantity of requirements for vehicle acceleration or deceleration;

a supply means for supplying said quantity of requirements for vehicle acceleration or deceleration to a driving section of said subject vehicle to drive said subject vehicle based on said quantity of requirements for vehicle acceleration or deceleration; and a transmission means for transmitting said quantity of requirements for vehicle acceleration or deceleration to another vehicle immediately after said subject vehicle so that said other vehicle immediately after said subject vehicle can receive said quantity of requirements for vehicle acceleration or deceleration as the quantity of input requirements for acceleration or deceleration.

In a preferred aspect of the present invention, if said quantity of requirements for vehicle acceleration or deceleration obtained in said addition means exceeds an acceleration or deceleration limit value for said subject vehicle, said supply means supplies said acceleration or deceleration limit value for said subject vehicle to the driving section of said subject vehicle.

In another aspect, the present invention is characterized in that if said subject vehicle comprises an automatic speed control means for maintaining a certain cruising speed by using a set of speed information thereof, said addition means sums up said quantity of input requirements for acceleration or deceleration, said quantity of operations for acceleration or deceleration and a quantity of requirements for automatic speed control which is arithmetically produced from said automatic speed control means, to determine said quantity of requirements for vehicle acceleration or deceleration.

In yet another aspect, the present invention is characterized in that said quantity of input requirements for acceleration or deceleration in said addition means represents a value determined by multiplying said quantity of input requirements for acceleration or deceleration received in said reception means by any arbitrary ratio.

The present invention further provides a stabilization control system of a vehicle traffic volume in a group of subject vehicles, said system characterized in comprising:

a reception means in one vehicle in said group of subject vehicles for receiving a quantity of input requirements for acceleration or deceleration that has been required in another vehicle immediately ahead of said one vehicle to control a distance between vehicles and a speed;

a measuring means in said one vehicle for measuring a quantity of operations for acceleration or deceleration to be applied by a driver of said one vehicle to control the distance between vehicles and the speed;

an addition means for adding said quantity of input requirements for acceleration or deceleration to said quantity of operations for acceleration or deceleration to determine a quantity of requirements for vehicle acceleration or deceleration;

a supply means for supplying said quantity of requirements for vehicle acceleration or deceleration to a driving section of said one vehicle to drive said one vehicle based on said quantity of requirements for vehicle acceleration or deceleration; and a transmission means for transmitting said quantity of requirements for vehicle acceleration or deceleration to another vehicle immediately after said one vehicle so that said other vehicle immediately after said one vehicle can receive said quantity of requirements for vehicle acceleration or deceleration as the quantity of input requirements for acceleration or deceleration, wherein all of said means for said one vehicle are implemented in respective vehicles in said group of subject vehicles.

In a preferred aspect of the present invention, if said quantity of requirements for vehicle acceleration or deceleration obtained in said addition means exceeds an acceleration or deceleration limit value for said one vehicle, said supply means supplies said acceleration or deceleration limit value for said one vehicle to the driving section of said one vehicle.

In another aspect, the present invention is characterized in that if said one vehicle comprises an automatic speed control means for maintaining a certain cruising speed by using a set of speed information thereof, said addition means sums up said quantity of input requirements for acceleration or deceleration, said quantity of operations for acceleration or deceleration and a quantity of requirements for automatic speed control which is arithmetically produced from said automatic speed control means, to determine said quantity of requirements for vehicle acceleration or deceleration.

In yet another aspect, the present invention is characterized in that the system is configured to employ said quantity of input requirements for acceleration or deceleration in said addition means as a value determined by multiplying said quantity of input requirements for acceleration or deceleration received in said reception means by any arbitrary ratio.

As described above, the present invention provides a method and a device, which is in one hand implemented as a man-machine system in which the operations are shared such that a driver takes charge of an inter-vehicle distance and speed control, while on the other hand a quantity of controls for stabilizing the traffic volume to be obtained as the inter-vehicle distance or an outcome therefrom is calculated automatically and additionally incorporated by the addition in respective vehicles, and thus incorporating the driver effectively and safely.

Mathematical Interpretation and Proof:

Mathematical interpretation of the present invention will now be described below. A specific position of each vehicle is denoted as $x_i$ and an acceleration input to the each vehicle is denoted as $u_i$. That is:

$$\ddot{x}_i = u_i$$

where, using $y_i$ as a distance between vehicles, if the definition is given as follows:

$$y_i = x_{i-1} - x_i$$

then, $$\ddot{y}_i = u_{i-1} - u_i$$

which is further z-converted spatially to give a result expressed as follows:

$$\ddot{y}_z = \frac{1-z}{z} u_z$$

The z-operator included in the right-hand side indicates a delayed transmission, and it is essential to offset and delete said delayed transmission from the viewpoint of control logic in order to provide a stable vehicle train control. Although this has been also previously reported, a novel interpretation thereof will be herein added.

A first consideration is directed to a case where a driver attempts to control a distance between his/her vehicle and a vehicle traveling ahead thereof. In this case, assuming that a speed error feedback gain and an inter-vehicle distance error feedback gain are denoted as $K_v$ and $K_x$, respectively, then the control logic is expressed to be:

$$u_z = -K_v(\dot{x}_z - \bar{\dot{x}}_z) + K_x(y_z - \bar{y}_z)$$

It is to be noticed that in the following expression, a variable added with a lateral bar on top thereof indicates a target value for the variable.

Since from the following expression:

$$y_z = \frac{1-z}{z} x_z,$$

$$\dot{x}_z = \frac{z}{1-z} \dot{y}_z$$

is given (attention should be paid to the minus sign), a closed-loop characteristic follows;

$$\ddot{y}_z = -K_v \left\{ \dot{y}_z - \frac{1-z}{z} \bar{\dot{x}}_z \right\} - K_x \frac{z-1}{z} \{y_z - \bar{y}_z\}$$

Herein, a simple interpretation of the above characteristic is given. The following equation can be given without losing generality, $$\bar{y}_z = 0$$

where, $K_v$ is sufficiently small and replaced as follows:

$$k_x = \Omega^2,$$

then a solution under an initial condition of yzo is given in $$y_z \cong \{y_{z0} - \bar{y}_z\}\cos\left(\sqrt{1-\left(\frac{1}{z}\right)}\Omega t\right) + \bar{y}_z$$

If the above equation is developed by (1/z) and resultant coefficients are evaluated, then the inter-vehicle distance can be determined. A first term gives a propagation of a difference between an initial condition and a target of control to a vehicle train, wherein the n-th inter-vehicle distance from the head of the train can be given by a developing factor of $(1/z)^n$, and in this simplified model, it may be given in $$\frac{1}{n!}\left(\frac{1}{2}\Omega^2 t^2\right)^n \cos\left(\Omega t - \left(\frac{n\pi}{2}\right)\right)$$

Theoretically, the phase should be different by 90 degrees for every inter-vehicle distance. This amplitude may be:

$$a_n = \frac{1}{n!}\left(\frac{1}{2}\Omega^2 t^2\right)^n$$

and if within an finite time, $$a_{n+1}/a_n \to 0,$$

thus, the inter-vehicle distance would not diverge. Contrary, for a finite train length, the inter-vehicle distance would diverge over time. In a sequence of inter-vehicle distance, ultimately, the amplitude causes a vibration expressed as:

$$|y_{z0} - \bar{y}_z|\left(\frac{1}{2}\Omega^2 t^2\right)$$

to be produced in the automobiles in the downstream train, which is further superposed, leading to the traffic congestion. It could be said that in order to avoid the congestion, effectively $$\Omega \ll 1$$

should be given to reduce sensibility for triggering the acceleration or deceleration operation in response to the inter-vehicle distance, though it could not be essentially avoided that the vibration propagated divergently to the automobiles in the downstream train would be induced. Consequently, if any disturbance in the inter-vehicle distance occurs, then the congestion should be induced without exception in the conventional method, in which the control is given by the driver who judges a distance with respect to the automobile ahead. In practice, since the term of speed feedback supplies damping, the congesting condition could be mitigated, and in addition since there is a saturation characteristic exists, where a rear vehicle could not pass over a vehicle traveling ahead, the divergence is successfully suppressed by inches.

Although a time constant of vibration in the vehicle interval in the train can be theoretically given by:

$$2\pi/\Omega,$$

an actually emerging cycle would be much longer than that, due to the limited acceleration or deceleration performance in each vehicle. For example, assuming that the acceleration limit is denoted as $A[m/s^2]$, and the error in the inter-vehicle distance relative to a target value when the full-power acceleration is to be provided is denoted as D[m], then, an equivalent $K_x$ is A/D, and the emerging cycle is expressed as:

$$2\pi/\sqrt{A/D}$$

If $A=1[m/s^2]$ and $D=100[m]$, the result of about 62 seconds should be obtained.

Novel Control Rule:

A novel control rule according to the present invention will now be described. It is herein assumed that the control rule is expressed as:

$$u_z = -K_v(\dot{x}_z - \bar{\dot{x}}_z) + K_x \frac{z}{z-1}(y_z - \bar{y}_z)$$

Similarly to the above, if the equation is rewritten with y, then the following equation would be given.

$$u_z = -K_v\left(\frac{z}{1-z}\dot{y}_z - \bar{\dot{x}}_z\right) + K_x \frac{z}{z-1}\{y_z - \bar{y}_z\}$$

The closed-loop characteristic is governed by $$\ddot{y}_z = -K_v\left\{\dot{y}_z - \frac{1-z}{z}\bar{\dot{x}}_z\right\} - K_x\{y_z - \bar{y}_z\}$$

The control system for the above, $y_z$, if $K_v$, $K_v$, $K_x > 0$, should be stable, and ultimately reach $$\dot{x}_z = \bar{\dot{x}}_z$$

and $$y_z = \bar{y}_z$$

In the proof of the stability concerning the $y_z$, the only problem is the negative sign of the coefficient, and if the time variation for $K_x$ is sufficiently small, that is:

$$\dot{K}_x < 2K_v$$

it can be proved that the stability is ensured in spite of its non-linearity.

Although the cruising speed required in respective vehicles is given as one common value in this description, it may be believed that a specified value should be given for the cruising speed from road traffic signs or the like and the value would be actually varied among the vehicles. However, what the above equation means is that the emerging result is only a small variation induced in each converging inter-vehicle distance but no substantial effect is given to the stability of the control response, causing no problem in this control method.

In this control logic, if the inverse $z^-$ conversion is applied, the resultant equation should be expressed specifically as follows:

$$v_1 = 0,$$

$$v_i = -K_x\{\bar{y}_i - (x_{i-1} - x_i)\} + K^* v_{i-1}$$

$$u_i = -K_v\{\dot{x}_i - \bar{\dot{x}}_i\} + v_i$$

If $K^* = 0$, this control logic is consistent with the typical inter-vehicle distance control performed by an ordinary driver. The process for renewing the $v_i$ can be done by each vehicle, and only the result therefrom can be transmitted to the each following vehicle to thereby provide the stability of the vehicle train as a whole. This method is referred to as a distributed integration control method in the present discussion. A novel point in the present suggestion resides in that a quantity of operations that is actually applied is not the information to be transferred in itself. The integration control architecture used herein is indeed equivalent to an architecture for integrally calculating the inter-vehicle distances to determine a distance from the specific leading vehicle in the controlling directed to provide constant inter-vehicle distances over the entire vehicle train, specifically in the case where the inter-vehicle distance error feedback gain is constant. In this extreme case, the above method is consistent with the method reported previously. However, the point in the present suggestion resides in that the distance would not be integrally calculated but instead the integration is performed with the control operation input $v_i$, which represents the novel point of the present method. An advantage obtained therefrom includes, among others, that the present method can eliminate the need of inter-vehicle distance calculation but allows the control quantity calculation work to rely on the driver of each vehicle.

When the operation relies on the driver, it is required to prove the stability for the case where the inter-vehicle distance error feedback gain is varied among respective vehicles, and it may be indicated as follows:

$$\dot{x}_z = \frac{z}{1-z}\dot{y}_z,$$

which may be further rewritten to be $$\begin{pmatrix} \dot{x}_1 \\ \dot{x}_1 \\ \dot{x}_1 \\ \cdot \end{pmatrix} = \begin{pmatrix} -1 & 0 & 0 & 0 \\ -1 & -1 & 0 & 0 \\ -1 & -1 & -1 & 0 \\ & & & \cdot \end{pmatrix} \begin{pmatrix} \dot{y}_1 \\ \dot{y}_1 \\ \dot{y}_1 \\ \cdot \end{pmatrix} = B \begin{pmatrix} \dot{y}_1 \\ \dot{y}_1 \\ \dot{y}_1 \\ \cdot \end{pmatrix}$$

where, assuming that the speed error feedback gain is given by the diagonal matrix $K_1$, and the inter-vehicle distance error feedback is given by the diagonal matrix $K_2$, which are varied among respective drivers, the closed-loop system will be described as:

$$\ddot{y} + K_1 B\dot{y} + K_2 y = 0$$

Considering now limitedly that it is invariant in case of linearity, the characteristic equation is given as:

$$\det\{s^2 1 + K_1 B_s + K_2\} = 0,$$

which is a lower triangular matrix, and a characteristic equation is described as:

$$\prod_i (s^2 + K_{1i}s + K_{2i}) = 0$$

It indicates that the stability over the entire system can be realized, if the stability in each individual inter-vehicle distance control is maintained. Although this is the characteristic limited to the linear time-invariant condition, it is indicated that even a difference, if any, in the skill corresponding to the $K_1$, $K_2$, associated with each specific driver could not make affect the stability over the entire system.

Algorithm in an Implementation:

An implementation model of the distributed control theory as described above will now be described. Although the above-discussed distributed control theory is excellent, there is one defect making it difficult to implement the theory. The quantity of operations that has been provided by the driver, based on which the quantity of operations to be relayed, $v_i$, is determined, represents a quantity of acceleration or deceleration required to control the distance between vehicles. However, it is not possible to measure only the quantity of acceleration or deceleration required for the inter-vehicle distance control separately from the quantity of operations done by the driver. This is because the task to be handled by the driver includes the inter-vehicle distance control and the speed control, which should be done simultaneously, and accordingly it is not possible to extract a part of the quantity of operations for acceleration or deceleration which is carried out exclusively for the inter-vehicle distance control.

Now by using the quantity of operations for acceleration or deceleration being carried out by the driver, which is denoted as $w_i$, and an assumed speed control model gain $$\bar{K}_v,$$

which is an approximation of the above-discussed $v_i$, a technique for approximately calculating a quantity corresponding to $v_i$ by offsetting from the $w_i$ will be considered. This is based on the fact that the practically usable information includes ultimately only the information of a requirement for acceleration or deceleration operation to be performed by the driver. Those can be expressed mathematically as follows:

$$w_i = -K_{xi}\{\bar{y}_i(x_{i-1}-x_i)\} - K_{vi}\{\dot{x}_i - \bar{\dot{x}}_i\}$$

$$v_i = w_i + \bar{K}_{vi}\{\dot{x}_i - \bar{\dot{x}}_i\} + K^* v_{i-1}$$

$$u_i = -\bar{K}_{vi}\{\dot{x}_i - \bar{\dot{x}}_i\} + v_i$$

where, the subscript i indicates the gain and the operation to be executed in each vehicle i. If the gain is different in one from the other, the expression in the z conversion is not suitable, and the expression is given by using the vector format. Assuming that the matrix A is expressed as:

$$A = \begin{pmatrix} -1 & & & 0 \\ 1 & -1 & & \\ & 1 & -1 & \\ 0 & & & \cdot \end{pmatrix} = B^{-1}$$

the series of operations as described above may be written as:

$$-A_v = K_x(y-\bar{y}) - (K_v - \bar{K}_v)(\dot{x}-\bar{\dot{x}}),$$

$$u = -\bar{K}_v(\dot{x}-\bar{\dot{x}}) + v$$

Consequently, a dynamic equation for the inter-vehicle distance may be described as follows:

$$\ddot{y} = Au = -K_x(y-\bar{y}) - (\bar{K}_v - \delta\bar{K}_v B)(\dot{y} - A\bar{\dot{x}})$$

where, $$\delta\bar{K}_v = \bar{K}_v - K_v$$

Without losing the generality, $$\overline{K}_v \text{ and } K_v$$

are both given in the diagonal matrix, and resultantly $$(\overline{K}_v - \delta \overline{K}_v B)$$

forms the lower triangular matrix, so the stability of the system results in the positive definite property of the $K_x$ diagonal element and the above-discussed characteristics in association with its derivative value, as well as the positive definite property of the diagonal element of $$(\overline{K}_v - \delta \overline{K}_v B).$$

The positive definite property of this diagonal element is always realized, as can be understood easily, and thus stable. It is a matter of course from the outcome of the above discussion that if $$\delta \overline{K}_v = 0,$$

meaning that the assumed speed error control gain model is consistent with the actual one by each driver, exactly the above-discussed result should emerge. In this regard, the attention should be paid on the case of $$\overline{K}_v = 0,$$

and in this case, the closed loop system associated with the inter-vehicle distance sequence produces $$\ddot{y} = -K_x(y - \bar{y}) - K_v(\dot{y} - A\bar{x})$$

whereby the inter-vehicle distance sequence may be stabilized in more simple form with an improvement achieved in the delayed operation originating from the driver. This may provide great advantage in a practical use.

Generalizing the above description, the following expression is given:

$$w_i = -K_{xi}\{\bar{y}_i - (x_{i-1} - x_i)\} - K_{vi}\{\dot{x}_i - \bar{\dot{x}}_i\}$$

$$v_i = w_i + K_v^* \overline{K}_{vi} \{\dot{x}_i - \bar{\dot{x}}_i\} + K^* v_{i-1}$$

$$u_i = w_i + K^* v_{i-1}$$

As discussed above, the K* represents a flag to indicate whether or not the distributed integration control is used and it can be set in each specific vehicle. Making the $K_v^*$ valid means that an existing automatic speed control unit equipped in an automobile unit is used. If the $K_v^* = 0$, the automatic speed control is made invalid, as described herein, but it is characterized in that whether or not the distributed control for the inter-vehicle distance is incorporated would not be affected but the inter-vehicle distance control can be stabilized.

Effect of the Invention

Although the controlling of the object to be handled in the present invention refers to the controlling of the distance between vehicles, it can be thought from the view point that the controlling in this context relies on the driver, the controlling referred herein substantially represents the stabilization control method of the vehicle traffic volume including eliminating of the congestion rather than the inter-vehicle distance control, which can help improve the phenomenon of congestion representing the unstable traffic volume on a highway or a railway significantly. In addition, more effective usability can be obtained by the control method using the quantity of acceleration or deceleration information according to the present invention working associatively with an existing automatic speed control unit. Further, the controlling according to the present invention provides an emergency braking operation responsive automatically to a sudden deceleration operation or the like in another vehicle traveling ahead, thus contributing to the improvement in the traffic safety. In addition, saving fuel and/or reducing a transportation time otherwise consumed due to the traffic congestion would contribute to suppress an economic loss.

Figure 1:
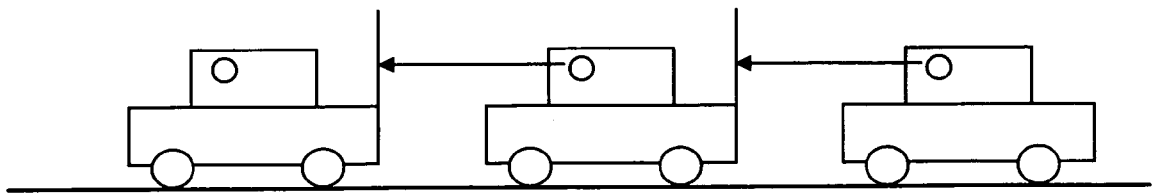
FIG. 1 shows an overview of a typical control between vehicles that may be provided by drivers.
Figure 2:
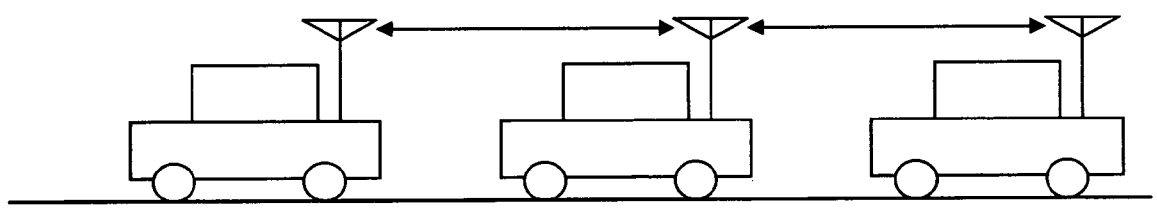
FIG. 2 shows an overview of a conventional control for a train of vehicles based on the premises of a measurement of a distance between vehicles.
Figure 3:
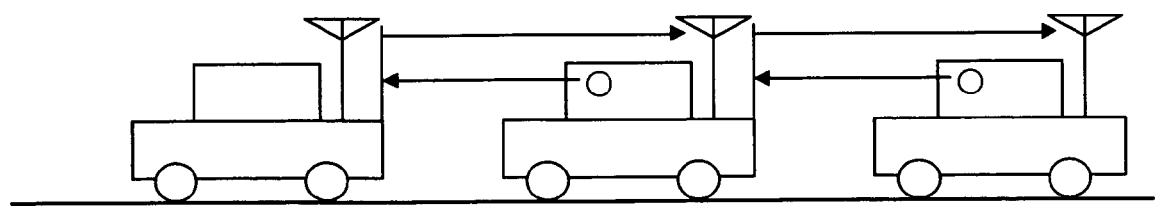
FIG. 3 shows an overview of a distributed control according to the present invention.

DESCRIPTION OF REFERENCE NUMERALS 11, 12: Quantity of input requirements for acceleration or deceleration
10: Inter-vehicle control section
14, 44: Quantity of requirements for vehicle acceleration or deceleration
20: Limiter
22: Quantity of requirements for limiter acceleration or deceleration
30: Traveling motion of a vehicle
34: Information of a vehicle speed
40: Inter-vehicle distance and speed controls by a driver
42: Quantity of operations for acceleration or deceleration
50: Automatic speed control unit

52, 62: Quantity of requirements for automatic speed control
60: Speed control section
64: Quantity of output requirements for acceleration or deceleration

DESCRIPTION OF THE PREFERRED EMBODIMENTS

With reference to the attached drawings, preferred embodiments of the present invention will now be described. It is to be understood that the following description is provided only for the illustrative purpose of the present invention but not intended to limit the technical scope of the present invention to any forms in the description below.

Figure 4:
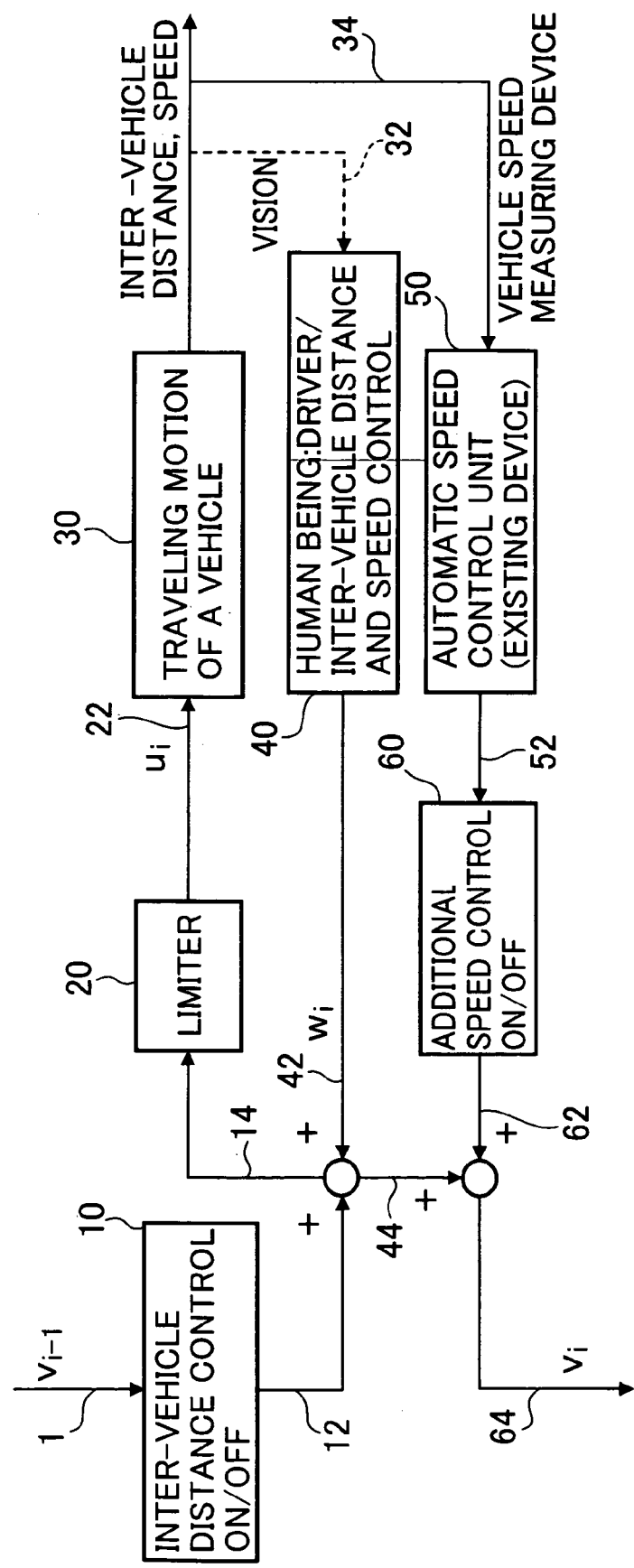
FIG. 4 shows a block diagram of a distributed control system according to the present invention.

FIG. 4 illustrates a typical control system for controlling an acceleration and deceleration of a vehicle in a semi-automatic manner by using a set of acceleration and deceleration information on a group of vehicles traveling ahead in order to provide a stable control of an automobile traffic volume. The control system according to the present invention has been built to include a distributed control taking advantage of the acceleration and deceleration information, as mentioned above, incorporated additionally in an existing system of automatic speed control unit. This does not mean, of course, that the distributed control would not work independently as a single function. As can be seen also from the above-given equation models, the present invention allows the distributed control constituting a principle part of the invention to be used in combination with the existing automatic speed control unit or to be separated from the automatic speed control unit in a contrary design.

The present system executes the steps of: taking a quantity of requirements for acceleration or deceleration required in the vehicle ahead as input information into a vehicle subject to the control; calculating the quantity of requirements for acceleration or deceleration to be applied to the vehicle subject to the control and supplying the calculated quantity to a driving section of the subject vehicle; and transmitting the calculated quantity of requirements for acceleration or deceleration to another following vehicle. All of the above steps may be performed in respective vehicles in the group subject to the control, wherein said quantity of requirements for acceleration or deceleration can be substantially relayed from the vehicles traveling ahead to the following vehicles to thereby control the entire traffic over the vehicle train. The present system will now be described in detail.

It is given as the premises that the vehicle subject to the control is equipped with a device for receiving the acceleration and deceleration information from the vehicle traveling ahead (not shown but referred hereinafter to as a receiving device). Firstly, the receiving device receives the quantity of input requirements for acceleration or deceleration $1(v_{i-1})$ required in the vehicle traveling ahead to control a distance between vehicles and a speed, and input the received quantity to an inter-vehicle distance control section 10. The inter-vehicle distance control section 10 serves as a switch capable of making a choice whether or not the quantity of input requirements for acceleration or deceleration 1 is to be used. The inter-vehicle distance control section 10 outputs a quantity of input requirements for acceleration or deceleration 12 based on the setting of the switch. Then, the quantity of input requirements for acceleration or deceleration 12 is added to a quantity of operations for acceleration or deceleration 42, which is to be applied to the vehicle as an inter-vehicle distance and speed control 40 by a driver who makes a determination (32) visually from a condition of a traveling motion 30 of the vehicle, or the distance between his/her vehicle and the vehicle ahead as well as the speed of his/her vehicle, and thus a quantity of requirements for vehicle acceleration or deceleration 14, 44 can be obtained.

On the other hand, an automatic speed control unit 50 calculates a quantity of requirements for automatic speed control 52 as the quantity of requirements for acceleration or deceleration required to maintain a certain cruising speed by using the speed information 34 of the subject vehicle, and outputs the calculated quantity to a speed control section 60. The speed control section 60 is serving as a switch capable of making a choice whether or not the quantity of requirements for automatic speed control 52 is to be used. Based on the setting of the switch, the speed control section 60 outputs the quantity of requirements for automatic speed control 62. Then, the quantity of requirements for automatic speed control 62 is added to the quantity of requirements for vehicle acceleration or deceleration 44 as described above to provide a quantity of output requirements for acceleration or deceleration 64 representative of a quantity of information to be transferred.

Further, the quantity of requirements for vehicle acceleration or deceleration 14 as discussed above is input to a limiter 20. The limiter 20 is provided to limit the requirement of acceleration or deceleration to the vehicle to a certain range of the acceleration and deceleration limit value. If the quantity of requirements for vehicle acceleration or deceleration 14 input to the limiter 20 falls within the limited value range, then the input value is directly output, but if exceeds the limit of range, the acceleration or deceleration limit value for the vehicle is output. If a quantity of requirements for limiter acceleration or deceleration 22 ($U_i$) output from the limiter 20 indicates the acceleration or deceleration limit value for the vehicle, the acceleration or deceleration limit value for the vehicle, instead of said quantity of output requirements for acceleration or deceleration 14, is supplied to the drive section of the vehicle in order to drive the vehicle. In this case, the drive section of the vehicle may drive the vehicle based on the quantity of requirements for limiter acceleration or deceleration 22.

Finally, a quantity of output requirements for acceleration or deceleration 64 ($V_i$) is transmitted to another following vehicle. The transmission may be performed by using a transmission device (not shown) having a function for transmitting the information.

All of the above steps may be executed equally in respective vehicles traveling with the aid of the present system. Accordingly, each one of the following vehicles can receive the quantity of input requirements for acceleration or deceleration 1 from the one traveling ahead (immediately ahead of the subject vehicle), and after executing the above-described steps, transmit the quantity of output requirements for acceleration or deceleration 64 to the following one (the vehicle immediately after the subject vehicle). This reception and transmission is relayed in the entire train of vehicles subject to the control, and this can leads to the stabilization of the traffic volume over the entire vehicle train.

In this regard, it may be recognized by the following vehicle as if the acceleration and deceleration information transmitted from the vehicle ahead were the quantity of requirements for acceleration or deceleration actually given to the vehicle ahead of the subject vehicle. However, in the present system, as described above, the quantity of requirements for acceleration or deceleration applied to each one of the respective vehicles is relayed to the following one of the respective vehicles. Consequently, it could be understood that the quantity of requirements for acceleration or deceleration input to each one of the vehicles substantially includes not only the quantity of requirements for acceleration or deceleration applied to the one vehicle traveling ahead but also that applied to the group of vehicles traveling ahead. It is to be noted that the quantity of input requirements for acceleration or deceleration in the second vehicle in the vehicle train would match to the quantity of operations for acceleration or deceleration that is actually applied by the driver in the first vehicle (if employing the automatic speed control unit, the quantity of operations for acceleration or deceleration added to the quantity of requirements for automatic speed control).

It could be said from the characteristic in the above-discussed operation that the present system is different from the control of vehicles according to the prior art that has employed the information relative to a vehicle traveling ahead. Specifically, the above-cited Patent Document 2 and non-Patent Document 3 have disclosed methods in which a distance from a vehicle traveling ahead is measured and a target vehicle speed is calculated so as to provide an acceleration or deceleration operation, and the system of the present invention is distinctive from the prior art methods in that the present system is configured to employ the acceleration and deceleration information that can be integrally determined and relayed from a group of vehicles traveling ahead. In other words, those prior art methods are different from the present invention directed to provide a distributed control by taking the behavior over the entire vehicle train which might lead to the traffic congestion into account, but the prior art methods are rather intended to control the speed of the subject vehicle in order to maintain the inter-vehicle distance relative to other vehicle immediately ahead of the subject one.

In the present system, turning off the switch of the inter-vehicle distance section 10 can make the system work as a system equipped with an existing automatic speed control unit, while turning off the switch of the speed control section 60 can provide the system with no automatic speed control unit 50. It is also possible to construct the present system separately to exclude the automatic speed control unit 50 as a part thereof. In the above cases, the quantity of requirements for vehicle acceleration or deceleration 44 produced by adding the quantity of operations for acceleration or deceleration 42 to the quantity of input requirements for acceleration or deceleration 12 is to be transmitted to the following vehicle as the quantity of output requirements for acceleration or deceleration 64. As discussed above, the present system is configured such that the devices to be installed in respective vehicles may be installed later in a simple manner. It can be seen that the present system is usable in combination with or contrary separately from the existing automatic speed control unit.

As discussed above, since the present system also allows for the configuration with no use of the automatic speed control unit 50, an inter-vehicle communication function, a distance measuring function and a relative speed measuring function are not essential components in the present invention. Further, the present invention is distinctive in that it can reduce resources necessary for the implementation to a significant degree. In addition, since the information transmission is provided in one direction only, advantageously the operation for departing out of or joining in the vehicle train can be performed freely in accordance with an individual determination by each one of the vehicles.

Although not illustrated, the present system allows the inter-vehicle distance section 10 not only to serve simply as a switch but also to be replaced with a variable gain element capable of outputting a value determined by multiplying the quantity of input requirements for acceleration or deceleration 1 by a desired ratio. It is believed that this can allow for the control of the subject vehicle and the additional quantity of requirements for acceleration or deceleration which has been integrated and relayed to be individually adjusted in each vehicle, thus making the present system more usable for the safety in driving operation. Furthermore, by using the present system, it may become possible to take advantage of the information that can be collected together as desired over the entire train of vehicles traveling ahead in addition to that of the vehicle just ahead, and thus provide a high extensibility.

As being obvious from the above-described configuration, the present system is not based on the assumption that the speed control of the subject vehicle would be provided by using the inter-vehicle distance information relative to the vehicle ahead but on the concept where a part for controlling an individual vehicle is constructed on the basis of the skill specific to the driver of each vehicle with additional incorporation of the acceleration and deceleration information of the vehicle ahead. It should be understood in this viewpoint that the present system is characterized in its providing a semi-automatic control and yet maintaining a complementary configuration of control of a man-machine system. It could be said that the present system has been made in the novel viewpoint where the control function of the inter-vehicle distance and speed can be made available in a range of function by a human being, while at the same time the information on a speed variation in a group of vehicles traveling ahead, which is otherwise difficult or delayed for the driver to recognize, can be additionally associated with a vehicle control of the driver so as to secure the stability.

It should be understood from the above description that the present system is loaded with a communication device which is not necessarily incorporated with a transponder function, in which a command of acceleration or deceleration operation performed by the driver is added with a quantity of inter-vehicle distance controls which can be integrated and relayed over respective vehicles in a train to form an acceleration or deceleration command for each one of the vehicles.

Embodiment 1

The description is now directed to an embodiment for applying the system that has been disclosed herein to a vehicle and a train of vehicles actually. An example of a numerical calculation used in the present embodiment will be shown below.

Example of Numerical Calculation:

A control to be provided for a case of an average cruising speed of 30m/s and a target inter-vehicle distance of 100 m was employed as an example. The numerical simulation was reviewed and evaluated from both viewpoints: [A] a recovery stability in case of sudden change in an inter-vehicle distance sequence during cruising; and [B] a recovery response from a complete congestion and stop state back to a cruising state. The train of vehicles included ten vehicles. Although it was assumed that an acceleration and deceleration performance of vehicles and skill of drivers are all equal for respective vehicles in a first example, the later examples took the case of varied performance and skill. Specifically, in the example employing the uniform performance and skill for respective vehicles, a simulation was made by introducing non-linearity including an acceleration and deceleration limit value of 1 m/s$^2$, a speed error feedback gain, $K_v$, of 1.0/sec, an inter-vehicle distance error feedback gain, $K_x$, of 0.5/sec$^2\times\{v(m/s)/30\}\}$. This is because the driver's characteristic exhibits that in the inter-vehicle distance control, the driver typically drives a vehicle with a reduced feedback gain as the vehicle speed is reduced (the driver would not make a sudden and rapid acceleration or deceleration). Similarly, the example taking the variation in the acceleration and deceleration performance and driving skill specific to each vehicle into account employed the acceleration and deceleration limit value depending on the engine performance specific to each one of ten vehicles, which were 1.0, 0.5, 0.5, 1.0, 2.0, 0.5, 0.5, 1.5, 0.5, 0.5 m/sec². The simulation assumed a difference in performance by a factor of four at maximum. Further, the speed error feedback gain were set as 1.0, 1.0, 0.5, 1.0, 0.75, 1.0, 1.5, 1.0, 0.75, 1.0/sec and the inter-vehicle distance error feedback gain were set as 0.5, 0.375, 0.5, 0.75, 0.5, 0.25, 0.5, 0.5, 0.875×{v(m/s)/30}}/sec². The speed proximal to 30 m/s exhibited $$\Omega \approx 1,$$

indicating that the example assumed the case in which the congestion was apt to occur easily. The maximum value for $$|\dot{v}|$$

represented the acceleration and deceleration limit for each vehicle, which was sufficient to satisfy a condition of $$\dot{K}_{xi} < 2K_{vi},$$

meaning that the non-linearity was not affecting the stability.

The control rule to be implemented in each vehicle employed $$w_i = -K_{xi}\{\overline{y}_i - (x_{i-1} - x_i)\} - K_{vi}\{\dot{x}_i - \overline{\dot{x}}_i\}$$

$$v_i = w_i + K_v^* \overline{K}_{vi}\{\dot{x}_i - \overline{\dot{x}}_i\} + K^* v_{i-1}$$

$$u_i = \begin{cases} (w_i + K^* v_{i-1}) \\ \text{or} \\ (w_i + K^* v_{i-1}) \frac{\text{Acceleration\_Limit}}{|w_i + K^* v_{i-1}|} \end{cases}$$

The term in the parentheses means that the upper term should be selected when the acceleration or deceleration requirement to each vehicle falls within the limit range, while the lower saturation characteristic should be added when exceeding the limit range. The difference relative to the theory as illustrated in the above algorithm for implementation resides in that the constraint to the acceleration and deceleration limit value is introduced in the stage of actual application to each vehicle. It is to be noted that the first vehicle in the train takes $v_1=0$.

The K* represents a switch to determine whether or not the distributed integration control is introduced by taking advantage of the novel control rule.

Besides, $$K_v^*$$

is a switch to determine whether or not the automatic cruising function (i.e., the automatic speed control function) is made valid as incorporated therein.

The result from the simulation conducted in accordance with the above description will now be described.

Figure 5:
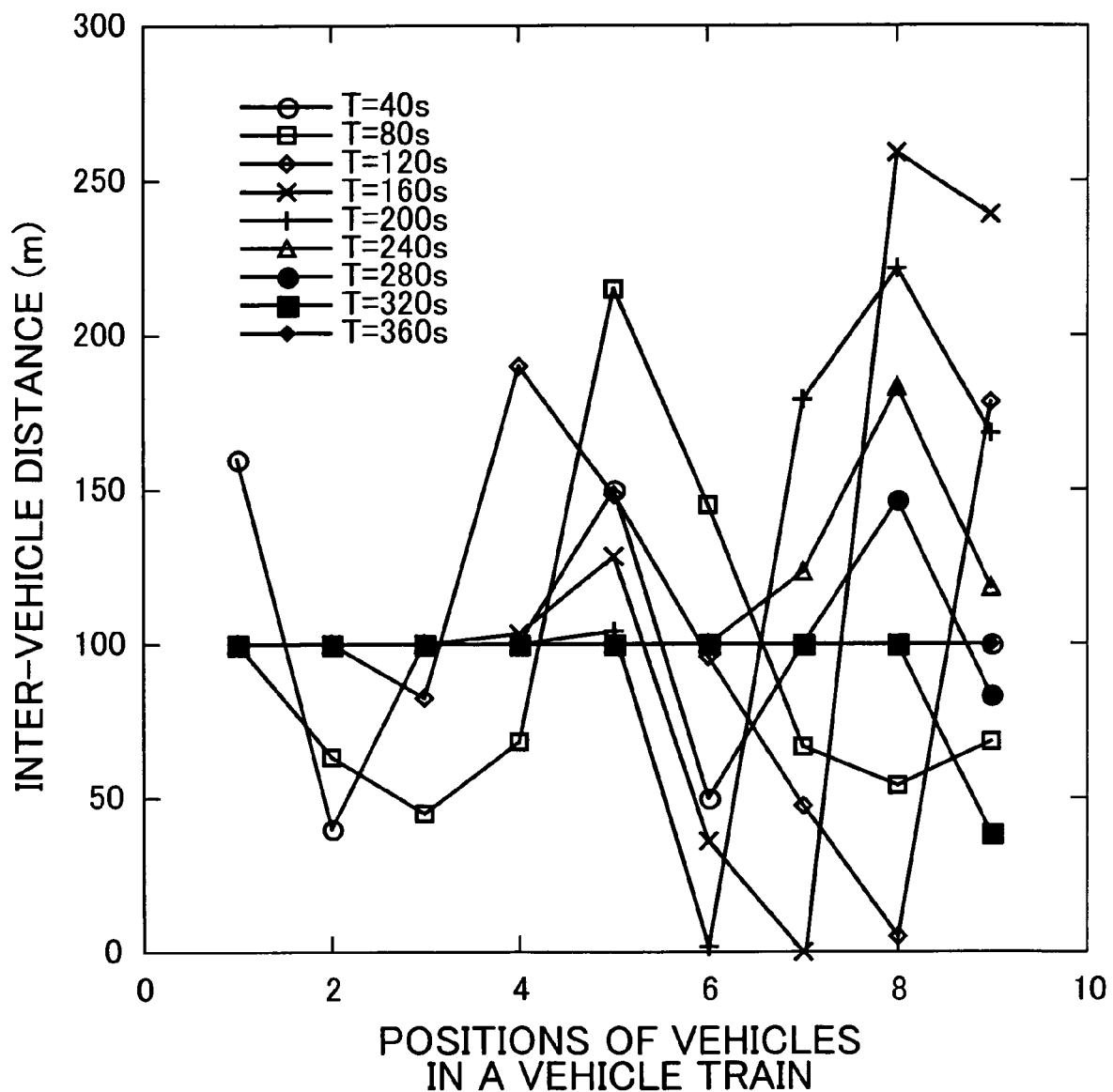
FIG. 5 shows an inter-vehicle distance control response during cruising in a normal controlling.

FIG. 5 shows an inter-vehicle distance control response during cruising in a normal control.

This indicates a response of inter-vehicle distance sequence for the case where sudden shifting of inter-vehicle distance transfer has caused such that the distance of a second vehicle relative to a leading vehicle of the train changes to 160 m and that of a sixth vehicle relative to a vehicle ahead of the sixth vehicle changes to 150 m (i.e., in case of disturbance). This represents an example of response of the inter-vehicle distance sequence based on a typical driver's operation. This example assumed that the performance and the skill of the driver are all same in respective vehicles in the train. It can be observed that a relatively stable control is provided over the vehicles traveling in the front of the train, but a great degree of vibration is seen over the vehicles in the downstream of the train, exhibiting a divergent phase into the congesting condition. Paying attention to each inter-vehicle distance, it can be seen that the congesting condition and the smooth running condition emerge periodically. It demonstrates that the control of the vehicle train could not be successfully provided even after 200 seconds.

Figure 6:
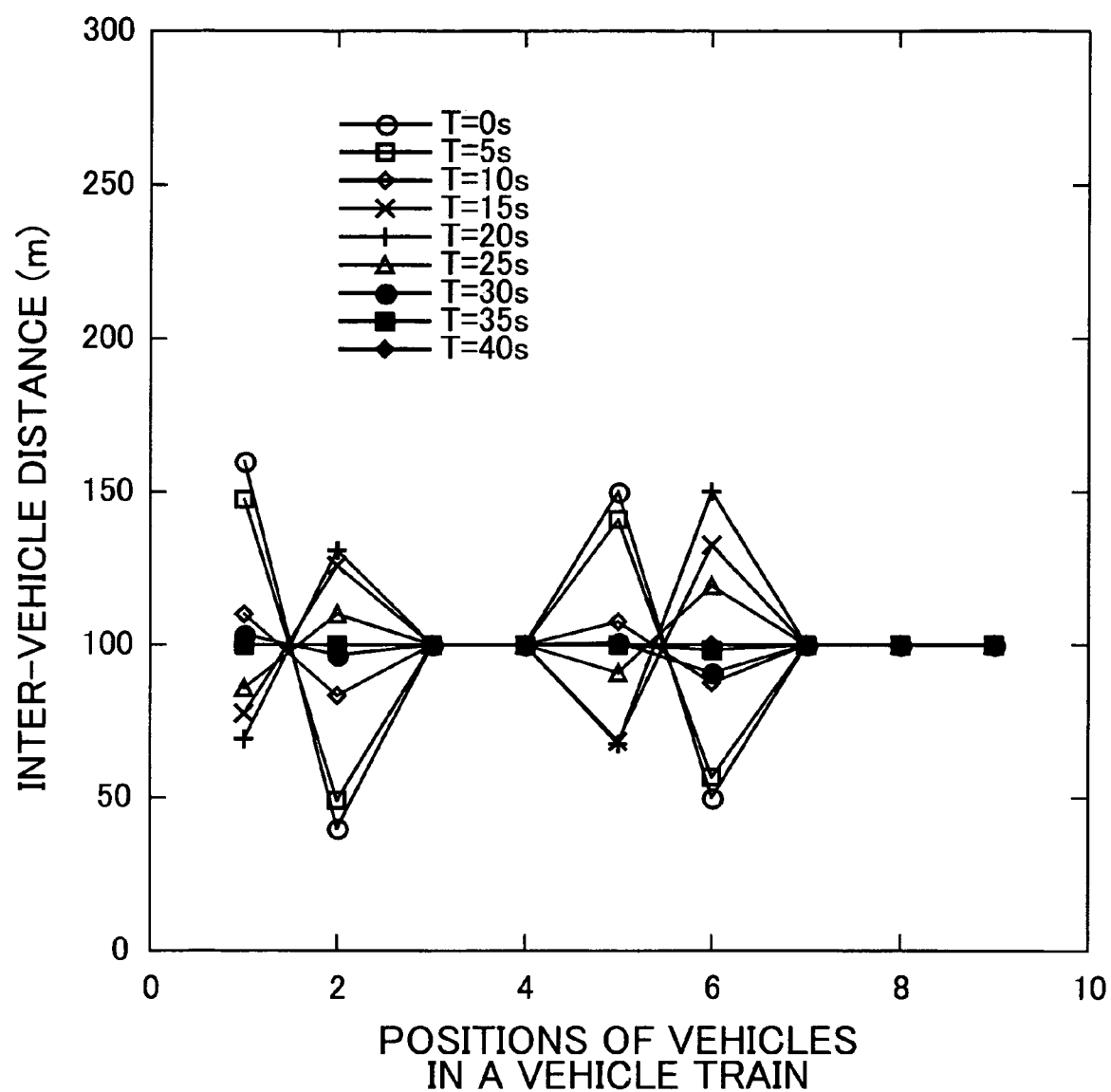
FIG. 6 shows an inter-vehicle distance control response during cruising by using a novel distributed integration control.

FIG. 6 shows an inter-vehicle distance control response during cruising for the case applied with the novel distributed integration control.

It indicates the response for the case where the novel distributed integration control has been introduced under the uniform acceleration and deceleration performance and driver's skill for respective vehicles. Relaying of the information volume to the following vehicles can successfully suppress the inter-vehicle distance variation so as to be damped to a local vibration, resulting in no occurrence of congestion and providing a sufficiently short time of convergence. The present method is characterized in that the information to be relayed represents a quantity determined by integrally accumulating the quantity of requirements for control operation generated by drivers from respective vehicles traveling ahead, but no inter-vehicle distance measuring or relative speed measurement is used. An improvement effect is dramatic.

Figure 7:
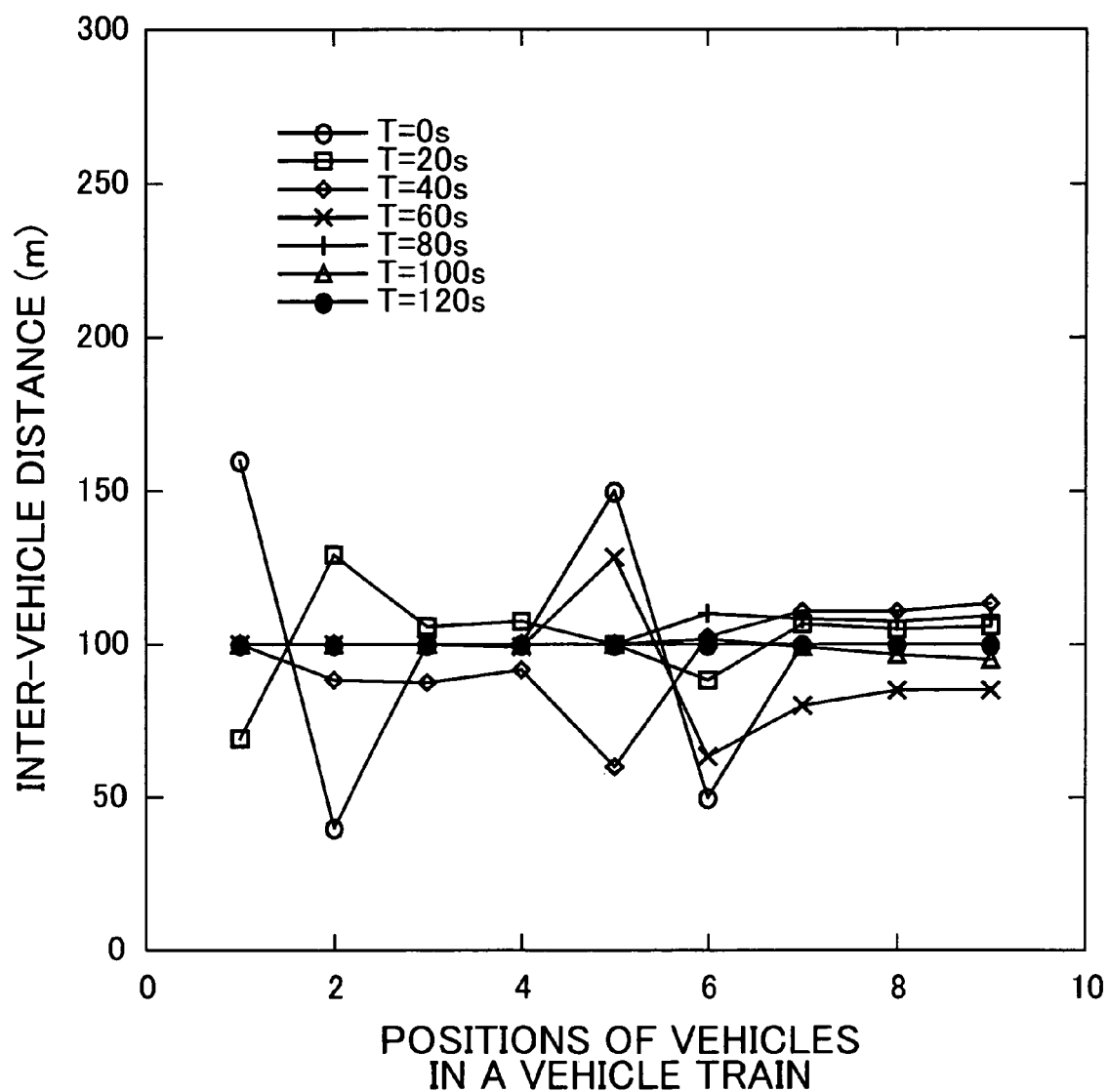
FIG. 7 shows an inter-vehicle distance control response during cruising for a switching gain=0.2 in the novel control rule.

FIG. 7 shows an inter-vehicle distance control response during cruising for the switching gain=0.2 in the novel control rule. It is to be noted that this switching gain represents a gain to be set by a variable gain element for outputting a value determined by multiplying the quantity of input requirements for acceleration or deceleration received by the reception means in respective vehicles by an arbitrary ratio, as such as described above.

Although it is logical to take the switching gain K* equal to 1.0 in order to make the novel control rule take fully effect, the value of 0.2 for the switching gain can be still expected to realize the dramatic improvement in response. This indicates that the present method allows the user of each vehicle to select a degree of incorporation of the vehicle train control into his/her own vehicle and also that even a small ratio of blending of the vehicle train control incorporated into his/her own vehicle can produce a significantly great effect. This also characterizes the present invention.

Figure 8:
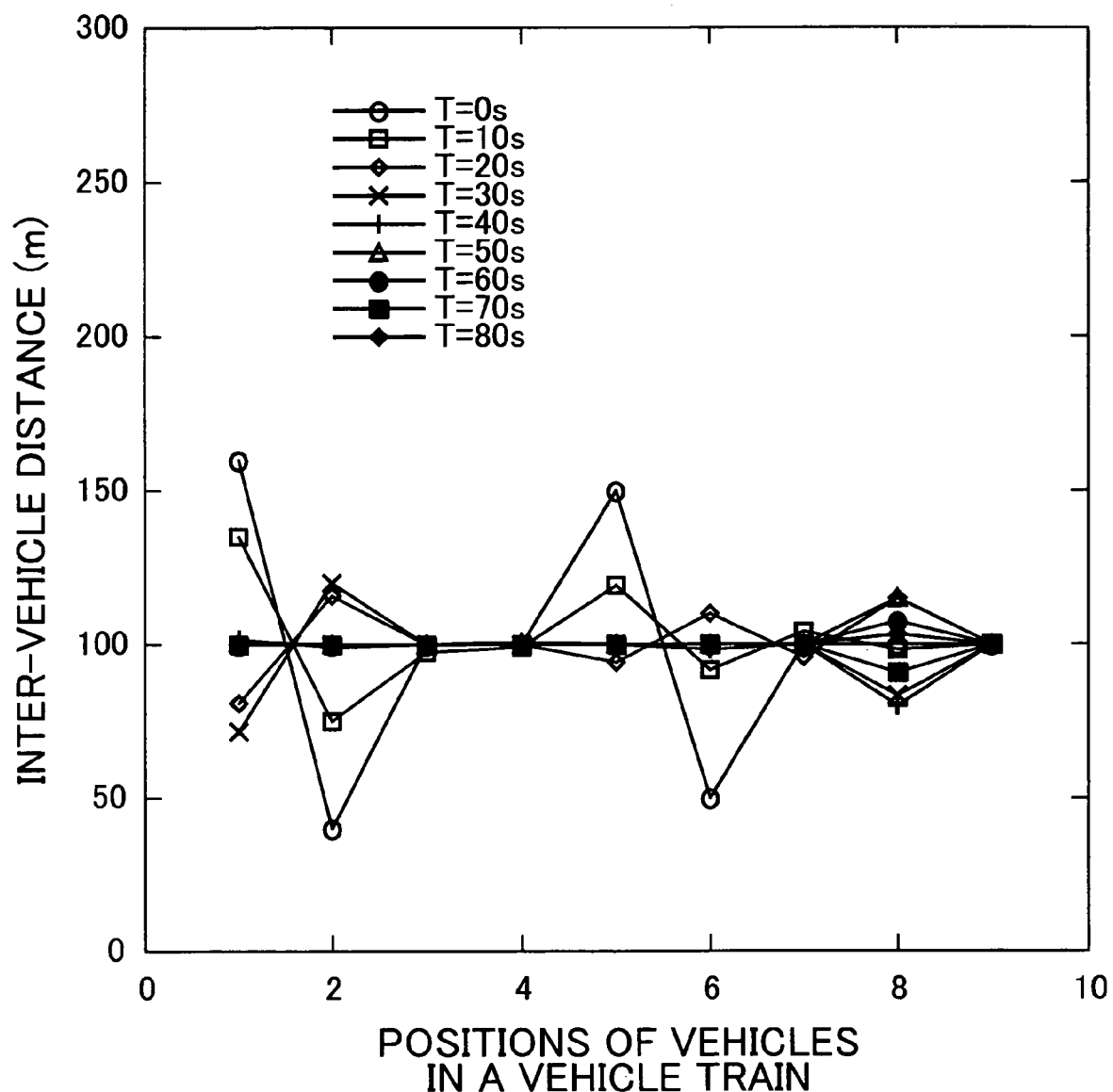
FIG. 8 shows an inter-vehicle control response during cruising for a case of varied performances of different vehicles and varied driving skills among different drivers.

FIG. 8 shows an inter-vehicle distance control response during cruising for a case of varied performance and driver's skill among respective vehicles.

This illustrates an example of response calculation for the above-examined case where the variations in acceleration and deceleration performance and driver's skill exist actually in respective vehicles under the novel control rule (K*=1).

Figure 9:
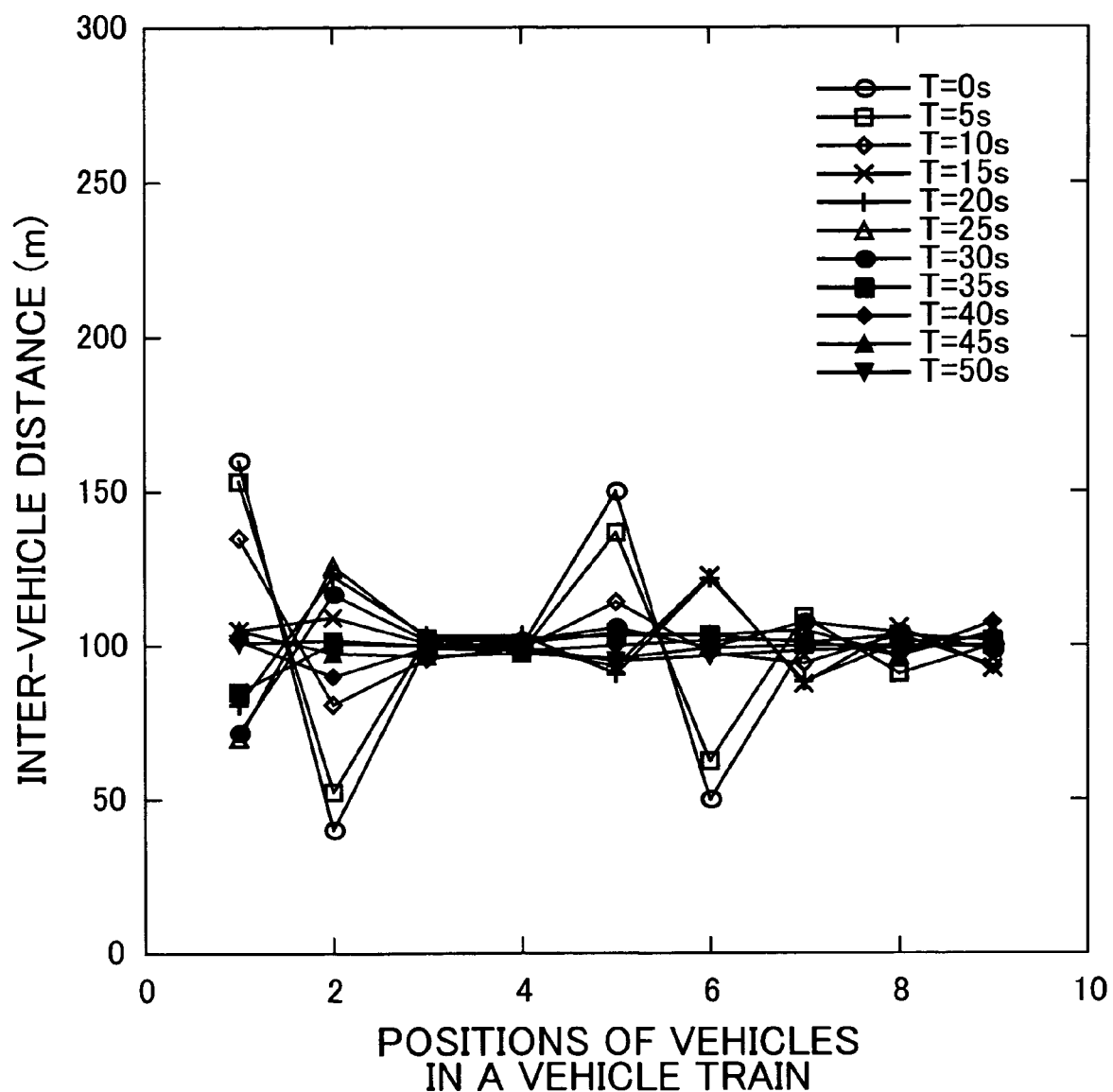
FIG. 9 shows an inter-vehicle control response during cruising for a case of variation among different vehicles (without automatic speed control)

FIG. 9 shows an inter-vehicle distance control response during cruising for variations existing in respective vehicles (with no automatic speed control provided).

Although the automatic speed control switch is turned off, the control system can be expected to provide the stability through the control operation to the inter-vehicle distance and speed by the driver, which is compensated with addition of the delayed vehicle train control by the distributed integration control. The illustration of FIG. 9 represents an example of this response and indicates that some variations still appear in dependence on the driving skill particular to each vehicle but the instability in association with the delayed propagation in the vehicle train has been successfully avoided.

Figure 10:
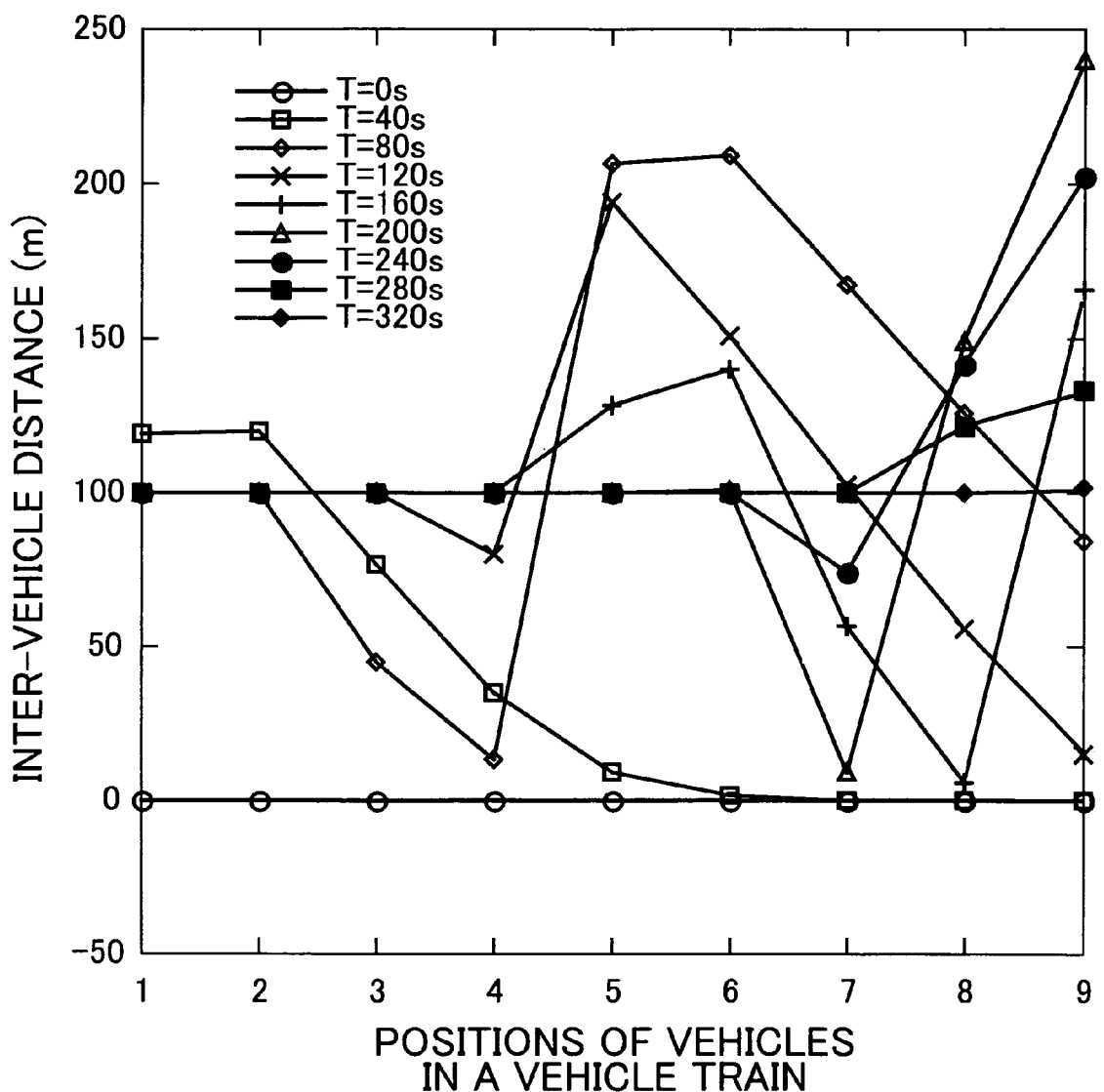
FIG. 10 shows a cruising recovery response from a traffic congestion in a normal controlling.

FIG. 10 shows a recovery response back to the cruising condition from the traffic congestion in the normal control.

This illustrates the recovery response to maintain a cruising inter-vehicle distance from the traffic congestion in the normal control. It takes as much as about 320 seconds to ultimately accomplish the specific inter-vehicle distance control and thus the stability at the cruising speed. This numerical example takes the acceleration and deceleration performance limit of 1 m/s² for each vehicle.

Figure 11:
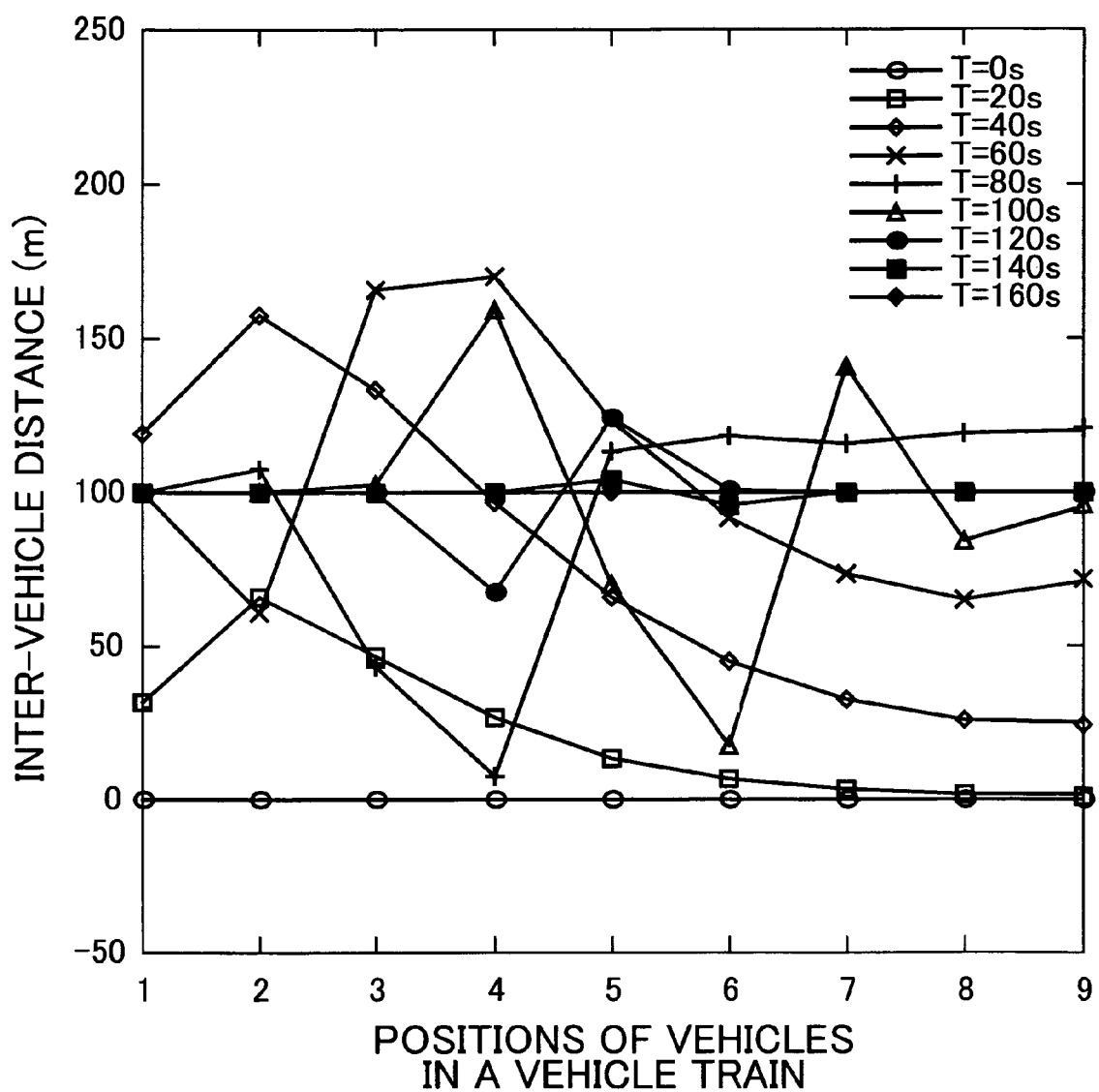
FIG. 11 shows a cruising recovery response from a traffic congestion by using a novel distributed integration control.

FIG. 11 shows a cruising recovery response from the traffic congestion by using the novel distributed integration control.

The recovery response from the traffic congestion with the aid of novel control rule does not demonstrate as dramatic an effect as that obtained in the control during cruising. Indeed, it can be observed that the inter-vehicle distance in the downstream of the train exhibits a vibration to be under the congesting condition. This is because the delayed speed control inherent to each vehicle essentially exists and it could not be handled only by the stabilization method. However, in the illustrated numerical example using the novel control rule, the time required for the cruising recovery has been reduced by half as compared to the case where each vehicle of the train is maneuvered individually by each driver.

Figure 12:
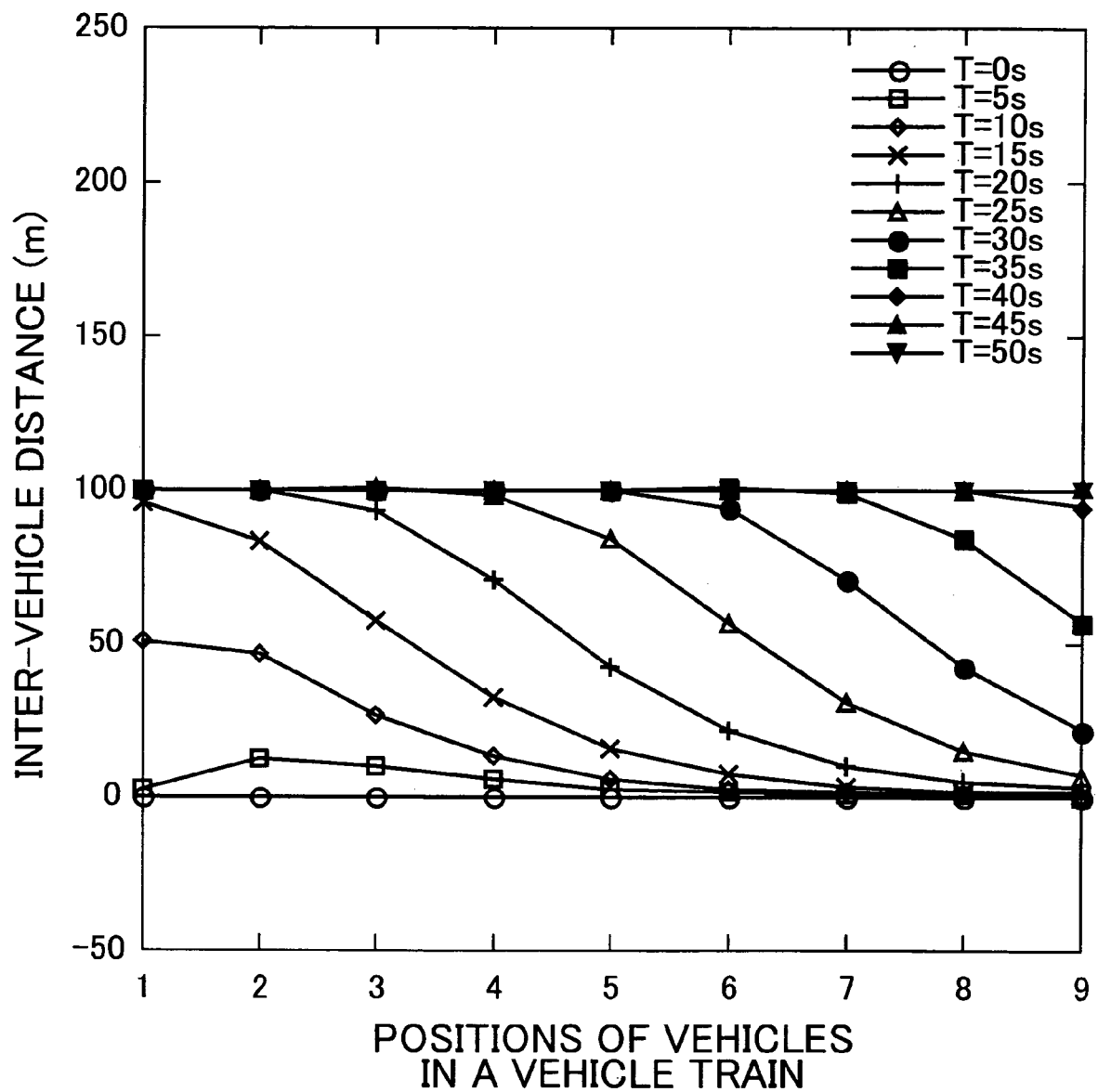
FIG. 12 shows a cruising recovery response from a traffic congestion in a novel distributed integration control on the condition of an acceleration and deceleration limit=3m/s$^2$.

FIG. 12 shows a cruising recovery response from the traffic congestion for the acceleration and deceleration limit=3 m/s² in the novel distributed integration control.

It has been found that one reason why the response is not favorable in FIG. 11 resides in a low acceleration and deceleration limit for each vehicle. FIG. 12 shows the result from a similar simulation with the limit increased up to 3 m/s². It can be found that although the convergence does not necessarily appear uniform, the convergence occurs asymptotically to the cruising vehicle train target. It could be said that under the novel control rule, the stabilizing time in the normal control can be improved as demonstrated in FIG. 11 and if any acceleration and deceleration limit existing, the asymptotic convergence to the target can be provided.

Figure 13:
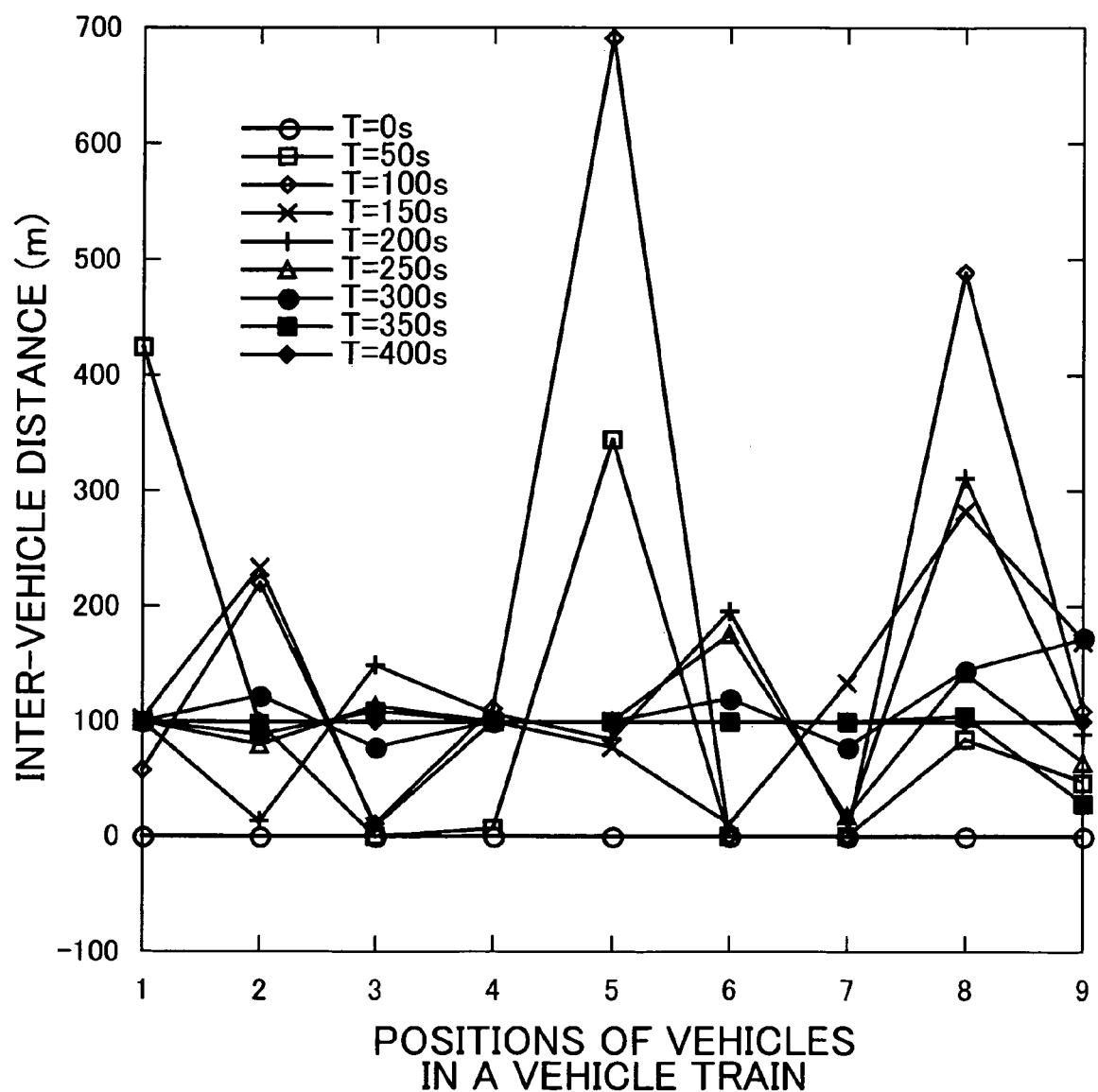
FIG. 13 shows a cruising recovery response from a traffic congestion in a novel distributed integration control on the condition of varied performances, varied driving skills.

FIG. 13 shows a cruising recovery from the traffic congestion for the varied performance and skill taken into account under the novel distributed integration control.

This illustrates the response under the novel distributed integration control rule for the cruising recovery from the traffic congestion, which is demonstrated by using a numerical example with the varied acceleration and deceleration performance limit and driver's skill taken into account. It could be found that although there is a certain period in which the inter-vehicle distance has increased significantly due to the variation in performance, the deviation has been later converged quickly back to the cruising condition. The variation is not small in this example, but it can be found that the novel control rule is actually effective for providing the inter-vehicle distance sequence control. The time required herein for stabilizing the inter-vehicle distance is 400 seconds.

Figure 14:
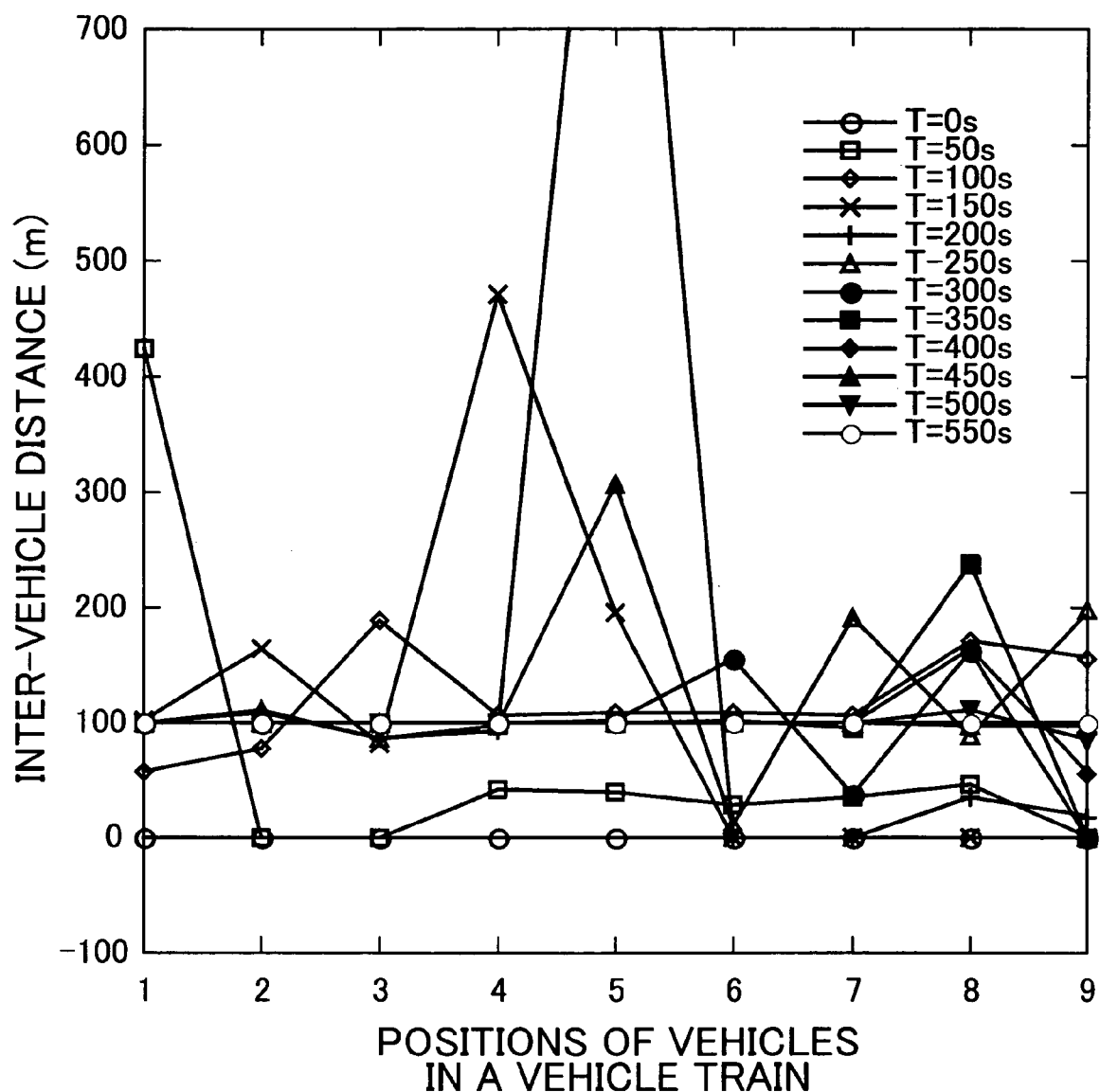
FIG. 14 shows a cruising recovery response from a traffic congestion in a novel distributed integration control on the condition of varied performances, varied driving skills and no automatic speed control unit.

FIG. 14 shows a cruising recovery response from the traffic congestion for the varied performance and skill taken into account under the novel distributed integration control with no automatic speed control unit provided.

This example illustrates a rising characteristic from the traffic congestion for the case where the performance and driver's skill is varied in each specific vehicle similarly to the above example and where the automatic speed control unit is not added in each vehicle. In this example, similarly to the above example, since a difference as large as four times in the acceleration and deceleration performance has been introduced between a fifth and a sixth vehicles, a significantly large increase in the inter-vehicle distance is induced in the course, but 500 seconds later, the stabilization has been completed.

In the comparative conventional control provided by respective vehicles independently via respective drivers without addition of the relayed integration function, the required stabilization time has reached up to 650 seconds.

As having been described above, the control theory suggested in the present discussion has primarily a function effective to improve instability in a traffic volume triggered by a disturbance in an inter-vehicle distance and speed control provided by a driver. A most distinctive feature thereof resides in its processing method characterized in that it does not need any inter-vehicle distance or relative speed measuring but a quantity of requirements for control to be added depending on the skill of the driver in each specific vehicle is processed in each vehicle in a distributed manner and appropriately added and/or integrated, and then a result may be relayed to a following vehicle. This method has been made in the light of a viewpoint for ensuring the control of inter-vehicle distance and/or speed to be obtained within a range of function attainable by a human being. Although the processing method employing the relaying in itself has been suggested also in the previous reports, the method in the present discussion is characterized in that its information volume to be transferred does not comprise a distance or a speed but includes a quantity of requirements for acceleration or deceleration operation to be additionally blended. This control system is also characterized in that hardware to be equipped in each vehicle is only means for data reception from a vehicle ahead and data transmission to a following vehicle without the need for a transponder function required for the distance measuring, thus allowing for an extremely easy implementation thereof. It is further characterized in that a great degree of freedom in operation by the driver in each vehicle can be obtained, and further distinctively characterized in that, completely different from the redundant automatic control system, each vehicle can individually select whether or not the additional operation volume for the relayed integration should be taken into account in each vehicle or can use the additional operation volume by an adjusted blending ratio for each specific vehicle. Since the volume of information to be transmitted is limited, an operation for joining in and/or departing from the inter-vehicle distance control sequence is also facilitated. Any automatic speed control units that have been already put into practical use can be used in a cruising speed control for a group of vehicles in a train in the future, and the application in combination with or separately from the automatic speed control unit may be selected, so that advantageous features of the automatic speed control unit can be used to help improve the control performance of the group cruising of the entire vehicle train. A time constant in response for the entire vehicle train may be defined by a time constant in control for the case with the automatic speed control unit equipped, while it can be determined as a time constant from a complex system of a time constant to be determined in dependence on the driver's skill in each vehicle for the case with no automatic speed control unit equipped. Since this is not a unilateral automatic control based on the inter-vehicle distance, the psychological affect imposed on the driver is small but a high level of safety can be provided.

On the other hand, regarding a recovery response to the cruising condition from the traffic congestion, a primary factor in a delayed rising resides in the restriction of acceleration and deceleration performance in respective vehicles, and so it is extremely difficult to provide a radical improvement simply via the selection of logic. If the present control theory is employed actually so as to mitigate the acceleration and deceleration restriction, then the response could turn out to be extremely good, but if the acceleration and deceleration restriction is imposed, the response exhibits a vibration phase and consequently a longer time is required for stabilization thereof. It is a matter of course that a significantly reduced stabilization time can be realized as compared to the normal control exclusively depending on the control provided by the driver in each vehicle.

The control method suggested herein is intended to make a significant improvement in a conventional individual control relying on the driver in both for the normal cruising and the recovery response from the congestion.

Although the present invention has been described with reference to some embodiments and examples, it should be easily understood that the present invention is not limited thereto but many different modifications may be made to those embodiments and examples. Furthermore, so far as those modifications are within the context of any one of the appended claims or its equivalent, they are accordingly considered to be included in a technical scope of the present invention. Although the above-discussed embodiments are individually directed to a specific vehicle train, the embodiments have been given for the illustrative purpose only but it is not intended to thereby limit the present invention to those specific examples.

What is claimed:

1. A stabilization control method of a vehicle traffic volume in a group of subject vehicles, comprising:
    a receiving step in one vehicle in said group of subject vehicles for receiving a quantity of input requirements for acceleration or deceleration that has been required in another vehicle immediately ahead of said one vehicle to control a distance between vehicles and a speed;
    a measuring step in said one vehicle for measuring a quantity of operations for acceleration or deceleration to be applied by a driver of said one vehicle to control the distance between vehicles and the speed;
    an addition step for adding said quantity of input requirements for acceleration or deceleration to said quantity of operations for acceleration or deceleration to determine a quantity of requirements for vehicle acceleration or deceleration;
    a supply step for supplying said quantity of requirements for vehicle acceleration or deceleration to a driving section of said one vehicle to drive said one vehicle based on said quantity of requirements for vehicle acceleration or deceleration; and
    a transmission step for transmitting said quantity of requirements for vehicle acceleration or deceleration to another vehicle immediately after said one vehicle so that said other vehicle immediately after said one vehicle can receive said quantity of requirements for vehicle acceleration or deceleration as the quantity of input requirements for acceleration or deceleration, wherein all of said steps subject to said one vehicle are executed in respective vehicles in said group of subject vehicles.

2. A method in accordance with claim 1, in which if said quantity of requirements for vehicle acceleration or deceleration obtained in said addition step exceeds an acceleration or deceleration limit value for said one vehicle, said supply step executes a step of supplying said acceleration or deceleration limit value for said one vehicle to the driving section of said one vehicle.

3. A method in accordance with claim 1, in which if said one vehicle comprises an automatic speed control means for maintaining a certain cruising speed by using a set of speed information thereof, said addition step executes a step of summing up said quantity of input requirements for acceleration or deceleration, said quantity of operations for acceleration or deceleration and a quantity of requirements for automatic speed control which is arithmetically produced from said automatic speed control means, to determine said quantity of requirements for vehicle acceleration or deceleration.

4. A method in accordance with claim 1, in which said quantity of input requirements for acceleration or deceleration in said addition step represents a value determined by multiplying said quantity of input requirements for acceleration or deceleration received in said receiving step by any arbitrary ratio.

5. A device for controlling an acceleration or deceleration of a subject vehicle in a semi-automatic manner by using a set of acceleration or deceleration information in a group of vehicles traveling ahead of said subject vehicle in order to provide a stabilization control of a vehicle traffic volume, said device comprising:
    a reception means in said subject vehicle for receiving a quantity of input requirements for acceleration or deceleration that has been required in other vehicle immediately ahead of said subject vehicle to control a distance between vehicles and a speed;
    a measuring means in said subject vehicle for measuring a quantity of operations for acceleration or deceleration to be applied by a driver of said subject vehicle to control the distance between vehicles and the speed;
    an addition means for adding said quantity of input requirements for acceleration or deceleration to said quantity of operations for acceleration or deceleration to determine a quantity of requirements for vehicle acceleration or deceleration;
    a supply means for supplying said quantity of requirements for vehicle acceleration or deceleration to a driving section of said subject vehicle to drive said subject vehicle based on said quantity of requirements for vehicle acceleration or deceleration; and
    a transmission means for transmitting said quantity of requirements for vehicle acceleration or deceleration to another vehicle immediately after said subject vehicle so that said other vehicle immediately after said subject vehicle can receive said quantity of requirements for vehicle acceleration or deceleration as the quantity of input requirements for acceleration or deceleration.

6. A device in accordance with claim 5, in which if said quantity of requirements for vehicle acceleration or deceleration obtained in said addition means exceeds an acceleration or deceleration limit value for said subject vehicle, said supply means supplies said acceleration or deceleration limit value for said subject vehicle to the driving section of said subject vehicle.

7. A device in accordance with claim 5, in which if said subject vehicle comprises an automatic speed control means for maintaining a certain cruising speed by using a set of speed information thereof, said addition means sums up said quantity of input requirements for acceleration or deceleration, said quantity of operations for acceleration or deceleration and a quantity of requirements for automatic speed control which is arithmetically produced from said automatic speed control means, to determine said quantity of requirements for vehicle acceleration or deceleration.

8. A device in accordance with claim 5, in which said quantity of input requirements for acceleration or deceleration in said addition means represents a value determined by multiplying said quantity of input requirements for acceleration or deceleration received in said reception means by any arbitrary ratio.

9. A stabilization control system of a vehicle traffic volume in a group of subject vehicles, comprising:
- a reception means in one vehicle in said group of subject vehicles for receiving a quantity of input requirements for acceleration or deceleration that has been required in another vehicle immediately ahead of said one vehicle to control a distance between vehicles and a speed;
- a measuring means in said one vehicle for measuring a quantity of operations for acceleration or deceleration to be applied by a driver of said one vehicle to control the distance between vehicles and the speed;
- an addition means for adding said quantity of input requirements for acceleration or deceleration to said quantity of operations for acceleration or deceleration to determine a quantity of requirements for vehicle acceleration or deceleration;
- a supply means for supplying said quantity of requirements for vehicle acceleration or deceleration to a driving section of said one vehicle to drive said one vehicle based on said quantity of requirements for vehicle acceleration or deceleration; and
- a transmission means for transmitting said quantity of requirements for vehicle acceleration or deceleration to another vehicle immediately after said one vehicle so that said other vehicle immediately after said one vehicle can receive said quantity of requirements for vehicle acceleration or deceleration as the quantity of input requirements for acceleration or deceleration, wherein all of said means for said one vehicle are implemented in respective vehicles in said group of subject vehicles.

10. A system in accordance with claim 9, in which if said quantity of requirements for vehicle acceleration or deceleration obtained in said addition means exceeds an acceleration or deceleration limit value for said one vehicle, said supply means supplies said acceleration or deceleration limit value for said one vehicle to the driving section of said one vehicle.

11. A system in accordance with claim 9, in which if said one vehicle comprises an automatic speed control means for maintaining a certain cruising speed by using a set of speed information thereof, said addition means sums up said quantity of input requirements for acceleration or deceleration, said quantity of operations for acceleration or deceleration and a quantity of requirements for automatic speed control which is arithmetically produced from said automatic speed control means, to determine said quantity of requirements for vehicle acceleration or deceleration.

12. A system in accordance with claim 9, in which said system is configured to employ said quantity of input requirements for acceleration or deceleration in said addition means as a value determined by multiplying said quantity of input requirements for acceleration or deceleration received in said reception means by any arbitrary ratio.

* * * * *